(12) United States Patent
Seki

(10) Patent No.: US 7,651,235 B2
(45) Date of Patent: Jan. 26, 2010

(54) PLANAR LIGHT SOURCE DEVICE AND LIQUID CRYSTAL DISPLAY DEVICE ASSEMBLY

(75) Inventor: Atsushi Seki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/246,143

(22) Filed: Oct. 6, 2008

(65) Prior Publication Data

US 2009/0122232 A1     May 14, 2009

(30) Foreign Application Priority Data

Nov. 13, 2007   (JP) .............................. 2007-294131

(51) Int. Cl.
*G09F 13/08* (2006.01)
(52) U.S. Cl. .................... 362/97.3; 362/249.02; 349/69
(58) Field of Classification Search ............ 362/249.02, 362/231, 555, 561, 97.1, 97.2, 97.3, 97.4, 362/800; 349/69, 61–68, 70–71
See application file for complete search history.

(56) References Cited

U.S. PATENT DOCUMENTS 4,851,824 A * 7/1989 Murata ........................ 345/83
5,767,837 A * 6/1998 Hara ........................... 345/694
7,281,816 B2 * 10/2007 Suzuki ........................ 362/231
2005/0184952 A1   8/2005 Konno et al.
2005/0259195 A1   11/2005 Koganezawa

FOREIGN PATENT DOCUMENTS

JP   2005-258403   9/2005
JP   2005-339822   12/2005

* cited by examiner

*Primary Examiner*—Gunyoung T Lee
(74) *Attorney, Agent, or Firm*—Oblon, Spivak, McClelland, Maier & Neustadt, L.L.P.

(57) ABSTRACT

A planar light source device configured to illuminate a transmissive liquid crystal device having a display region configured of pixels arrayed in a two-dimensional matrix from the rear side, includes: planar light source units corresponding to hypothetical display region units into which the liquid crystal display device is divided; a light source provided to each planar light source unit has $j_C \times j_R$ ($j_C \leq 2$, $j_R \leq 2$) light-emitting device units which are classified into first and second light-emitting device units; each light-emitting device unit being configured of i ($i \leq 1$) red, 2i green, and i blue light-emitting devices. At each planar light source unit, the light-emitting devices of each color are classified into first and second luminance values. The classification categories differ between first and second light-emitting device units. The first light-emitting device unit and the second light-emitting device unit are placed in at least twofold rotational symmetry.

11 Claims, 15 Drawing Sheets

FIG. 5A

| 50A | 50B | 50A | 50B | 50A | 50B |
|-----|-----|-----|-----|-----|-----|
| 50B | 50A | 50B | 50A | 50B | 50A |
| 50A | 50B | 50A | 50B | 50A | 50B |
| 50B | 50A | 50B | 50A | 50B | 50A |
| 50A | 50B | 50A | 50B | 50A | 50B |
| 50B | 50A | 50B | 50A | 50B | 50A |

| 50A | 50B | 50A | 50B | 50A | 50B |
|-----|-----|-----|-----|-----|-----|
| 50A | 50B | 50A | 50B | 50A | 50B |
| 50B | 50A | 50B | 50A | 50B | 50A |
| 50B | 50A | 50B | 50A | 50B | 50A |
| 50A | 50B | 50A | 50B | 50A | 50B |
| 50A | 50B | 50A | 50B | 50A | 50B |

| | | | | | | | | | |
|---|---|---|---|---|---|---|---|---|---|
| 50A | 50B | 50A | 50B | 50A | 50A | 50B | 50A | 50B | 50A |
| 50B | 50A | 50B | 50A | 50B | 50B | 50A | 50B | 50A | 50B |
| 50A | 50B | 50A | 50B | 50A | 50A | 50B | 50A | 50B | 50A |
| 50B | 50A | 50B | 50A | 50B | 50B | 50A | 50B | 50A | 50B |
| 50A | 50B | 50A | 50B | 50A | 50A | 50B | 50A | 50B | 50A |
| 50B | 50A | 50B | 50A | 50B | 50B | 50A | 50B | 50A | 50B |
| 50A | 50B | 50A | 50B | 50A | 50A | 50B | 50A | 50B | 50A |
| 50B | 50A | 50B | 50A | 50B | 50B | 50A | 50B | 50A | 50B |
| 50A | 50B | 50A | 50B | 50A | 50A | 50B | 50A | 50B | 50A |
| 50B | 50A | 50B | 50A | 50B | 50B | 50A | 50B | 50A | 50B |

| | | | | | |
|---|---|---|---|---|---|
| 50A | 50B | 50C | 50A | 50B | 50C |
| 50B | 50A | 50B | 50B | 50A | 50B |
| 50C | 50B | 50A | 50C | 50B | 50A |
| 50A | 50B | 50C | 50A | 50B | 50C |
| 50B | 50A | 50B | 50B | 50A | 50B |
| 50C | 50B | 50A | 50C | 50B | 50A |

← 42

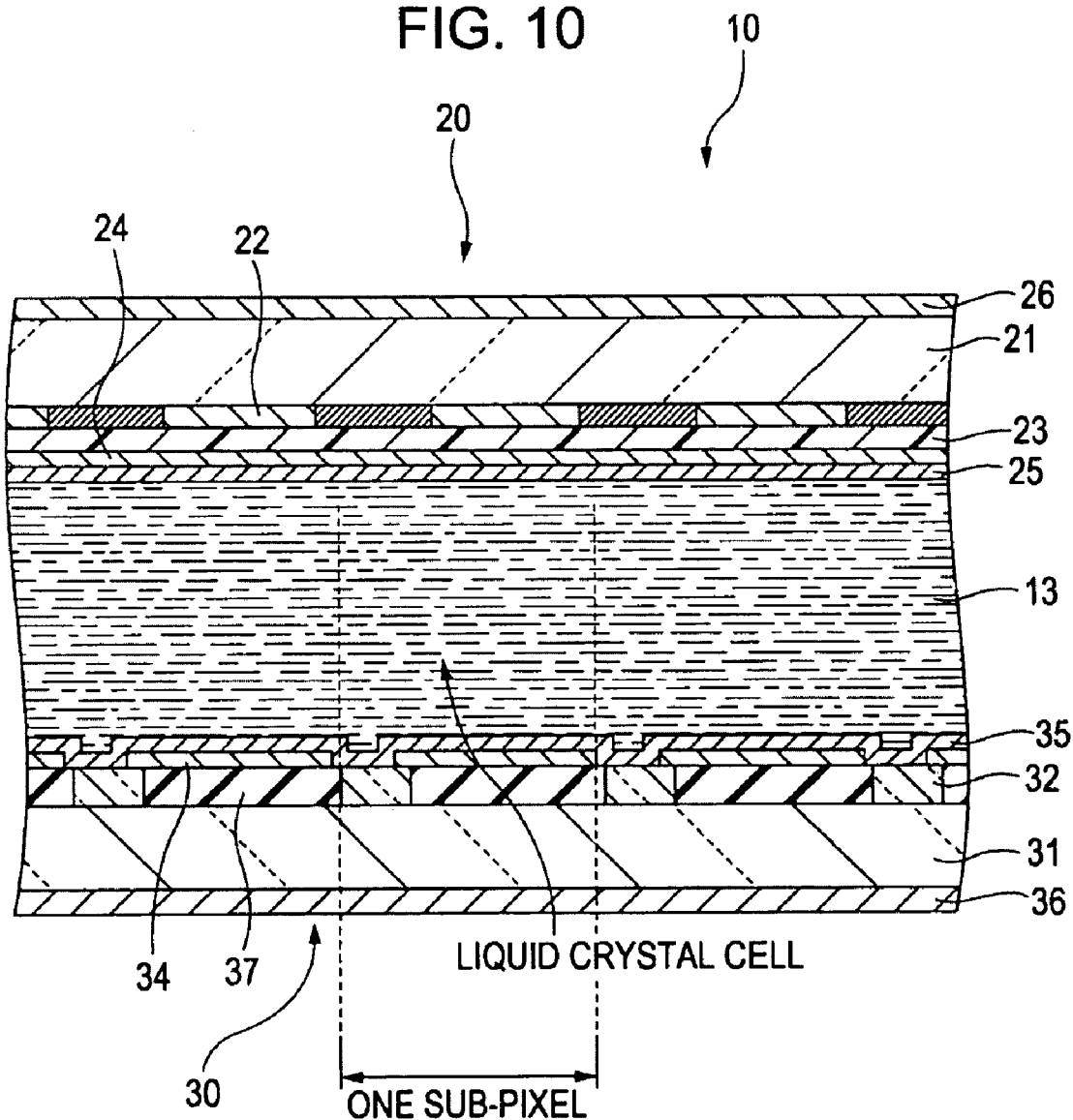

VALUE OF DRIVING SIGNAL VALUE TO THE 2.2'ND POWER
$(x' \equiv x^{2.2})$

VALUE OF CONTROL SIGNAL (X)

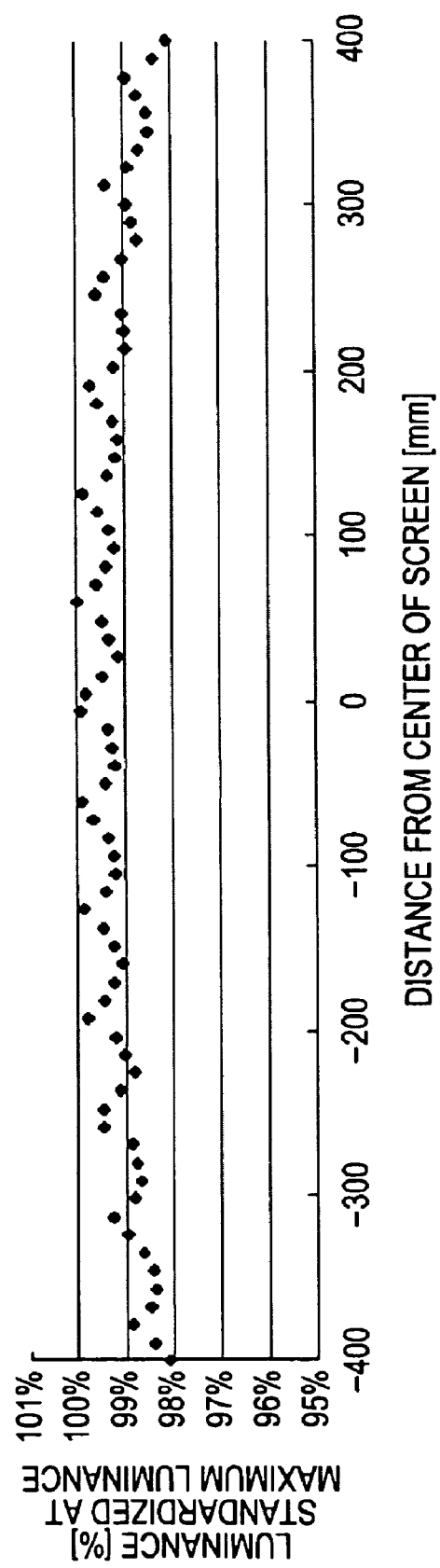

PLANAR LIGHT SOURCE DEVICE AND LIQUID CRYSTAL DISPLAY DEVICE ASSEMBLY

CROSS REFERENCES TO RELATED APPLICATIONS

The present invention contains subject matter related to Japanese Patent Application JP 2007-294131 filed in the Japanese Patent Office on Nov. 13, 2007, the entire contents of which are incorporated herein by reference.

BACKGROUND OF THE INVENTION

1. Field of the Invention

The present invention relates to a planar light source device and a liquid crystal display device assembly.

2. Description of the Related Art

With liquid crystal display devices, the liquid crystal material itself does not emit light. Accordingly, a planar light source device (backlight) is placed at the rear face of and immediately under a display region configured of multiple pixels, so as to illuminate the display region of the liquid crystal display device, for example. Note that with a color liquid crystal display device, one pixel is configured of the three sub-pixels of a red light-emitting sub-pixel, a green light-emitting sub-pixel, and a blue light-emitting sub-pixel, for example. An image is displayed by causing liquid crystal cells making up each sub-pixel to serve as a type of light shutter (light valve), i.e., by controlling the light transmissivity (aperture ratio) of each sub-pixel to control the light transmissivity of the illumination light (e.g., white light) emitted from the planar light source device.

With related art, a planar light source device in a liquid crystal display device assembly illuminates the entire display region with a uniform and constant brightness, but a configuration different from such a planar light source device, i.e., a planar light source device of a configuration which is configured of multiple light-emitting device units in which the illumination distribution of multiple display region units is changed (a partial driving type or a division-driving type planar light source device) is described in Japanese Unexamined Patent Application Publication No. 2005-258403. Such control of the planar light source device (also called partial driving or division driving of the planar light source device) is used to increase contrast ratio due to increase in the white level and reduction in the black level at the liquid crystal display device, whereby image display quality can be improved, and power consumption of the planar light source device can be reduced.

The light source making up each planar light source unit in the planar light source device is often configured of red light-emitting diodes, green light-emitting diodes, and blue light-emitting diodes, with white light being obtained by color mixing of the red light, green light, and blue light obtained by emitting light from these light-emitting diodes, and illuminating the display region of the liquid crystal display device with this white light.

SUMMARY OF THE INVENTION

Now, luminance irregularities in the white light serving as the illumination light emitted from the planar light source units is preferably suppressed to a degree which is not disagreeable for the viewer of the liquid crystal display device. To this end, it is desirable that the maximum luminance of the illumination light emitted from each planar light source is as close the same as possible between each planar light source. In order to satisfy such demand, the properties of the red light-emitting diode (light emission intensity, etc.), the properties of the green light-emitting diode (light emission intensity, etc.), and the properties of the blue light-emitting diode (light emission intensity, etc.), making up the light source of the planar light source units, should be uniform.

However, in reality, completely preventing irregularities in light emission intensity of manufactured light-emitting diodes, and completely preventing such irregularities, is extremely difficult. On the other hand, selecting light-emitting diodes so that the light emission intensity values of the light-emitting diodes making up the light source of the planar light source units are the same between the planar light source units will make the manufacturing cost of the planar light source device prohibitively expensive.

Accordingly, in the production of the planar light source device, for example, a great number of red light-emitting diodes, a great number of green light-emitting diodes, and a great number of blue light-emitting diodes, are each classified into two categories for example, based on light emission intensity. Such classification is called "binning". Generally, the light emission intensity of green light-emitting diodes is lower than the light emission intensity of red light-emitting diodes and green light-emitting diodes. Accordingly, one light emitting-device unit is often configured of, for example, one red light-emitting diode, two green light-emitting diodes, and one blue light-emitting diode. Here, we will assume a case of configuring one planar light source unit from four light-emitting device units. Also in this case, a configuration can be conceived wherein each of two of the light-emitting device units have a configuration of (one high-emission-intensity red light-emitting diode, two high-emission-intensity green light-emitting diodes, and one high-emission-intensity blue light-emitting diode), and each of the remaining two light-emitting device units have a configuration of (one low-emission-intensity red light-emitting diode, two low-emission-intensity green light-emitting diodes, and one low-emission-intensity blue light-emitting diode), with the four light-emitting device units being placed in twofold rotational symmetry, as schematically illustrated in FIG. 14A. Note that in FIG. 14A and also in later-described FIG. 14B, red light-emitting diodes are indicated by a symbol wherein an "R" is placed in a circle, green light-emitting diodes are indicated by a symbol wherein a "G" is placed in a circle, and blue light-emitting diodes are indicated by a symbol wherein a "B" is placed in a circle. Also, high-emission-intensity light-emitting diodes are indicated by large circles, and low-emission-intensity light-emitting diodes are indicated by small circles. Further, light-emitting device units are indicated by dotted squares.

However, study made by the present Inventor has revealed that with such a placement, luminance irregularities of short cycles occur among the planar light source units, as shown in FIGS. 15 and 16. Note that FIG. 15 illustrates luminance irregularities along the X direction (horizontal direction in screen, and first direction) at the center of the Y direction (vertical direction in screen, and second direction) of the color liquid crystal display device, and FIG. 16 is a photograph illustrating a state wherein luminance irregularities have occurred on a color liquid crystal display device. In the event that luminance irregularities of approximately 1% occur in values standardized at the maximum luminance, this is observed as luminance irregularities.

There has been recognized the demand to provide a planar light source device having a configuration wherein luminance irregularities of a short cycle do not readily occur among light-emitting device units, and a liquid crystal display device assembly into which the planar light source device has been assembled.

A planar light source device according to a first mode of an embodiment of the present invention for achieving the above objects is a planar light source device configured to illuminate a transmissive liquid crystal device having a display region configured of pixels arrayed in a two-dimensional matrix from the rear side. Also, a liquid crystal display device assembly according to the first mode of an embodiment of the present invention for achieving the above objects is a liquid crystal display device assembly including (i) a transmissive liquid crystal device having a display region configured of pixels arrayed in a two-dimensional matrix; and (ii) a planar light source device configured to illuminate the transmissive liquid crystal device from the rear side.

The planar light source device according to the first mode of an embodiment of the present invention, or the planar light source device in the liquid crystal display device assembly according to the first mode of an embodiment of the present invention (hereinafter, these will be collectively referred to as "planar light source device and the like according to the first mode"), are made up of P×Q planar light source units corresponding to P×Q display region units assuming the display region of the liquid crystal display device is divided into P×Q hypothetical display region units; wherein a light source provided to each planar light source unit has $j_C \times j_R$ (where $j_C$ and $j_R$ are integers of 2 or greater) light-emitting device units; and wherein the light-emitting device units in each planar light source unit are classified into at least a first light-emitting device unit and a second light-emitting device unit; and wherein each light-emitting device unit is configured of i (where i is an integer of 1 or greater) red light-emitting devices which emit red light, 2i green light-emitting devices which emit green light, and i blue light-emitting devices which emit blue light; and wherein, at each planar light source unit;

(A) red light-emitting devices are classified into red light-emitting devices having a first luminance value, and red light-emitting devices having a second luminance value lower than that of the first luminance value, (B) green light-emitting devices are classified into green light-emitting devices having a first luminance value, and green light-emitting devices having a second luminance value lower than that of the first luminance value, (C) blue light-emitting devices are classified into blue light-emitting devices having a first luminance value, and blue light-emitting devices having a second luminance value lower than that of the first luminance value, (D) the classification category of the luminance value of the red light-emitting devices making up the first light-emitting device unit differs from the classification category of the luminance value of the red light-emitting devices making up the second light-emitting device unit, (E) the 2i green light-emitting devices making up each green light-emitting device unit are configured of green light-emitting devices having a first luminance value, and green light-emitting devices having a second luminance value, (F) the classification category of the luminance value of the blue light-emitting devices making up the first light-emitting device unit differs from the classification category of the luminance value of the blue light-emitting devices making up the second light-emitting device unit, and (G) the first light-emitting device unit and the second light-emitting device unit are placed in at least twofold rotational symmetry.

Note that the light-emitting device units in each planar light source unit are classified into at least a first light-emitting device unit and a second light-emitting device unit. Specifically, the light-emitting device units are classified into a first light-emitting device unit and a second light-emitting device unit, or classified into a first light-emitting device unit and a second light-emitting device unit and a third light-emitting device unit, or classified into a greater number of light-emitting device units. Also it is sufficient for the number i to be 1 or greater, specific examples including 1, 2, 3, . . . .

A planar light source device according to a second mode for achieving the above objects is a planar light source device configured to illuminate a transmissive liquid crystal device having a display region configured of pixels arrayed in a two-dimensional matrix of a first direction and a second direction orthogonal to the first direction, from the rear side. Also, a liquid crystal display device assembly according to the second mode for achieving the above objects is a liquid crystal display device assembly including:

(i) a transmissive liquid crystal device having a display region configured of pixels arrayed in a two-dimensional matrix of a first direction and a second direction orthogonal to the first direction; and (ii) a planar light source device configured to illuminate the transmissive liquid crystal device from the rear side.

The planar light source device according to the second mode, or the planar light source device in the liquid crystal display device assembly according to the second mode (hereinafter, these will be collectively referred to as "planar light source device and the like according to the second mode"), include a total of $P \times Q \times j_C \times j_R$ (where P and Q are positive integers, and $j_C$ and $j_R$ are integers or 2 or greater) light-emitting device units of $P \times j_C$ in the first direction and $Q \times j_R$ in the second direction; wherein each light-emitting device unit is configured of i (where i is an integer of 1 or greater) red light-emitting devices which emit red light, 2i green light-emitting devices which emit green light, and i blue light-emitting devices which emit blue light; and wherein, with a light-emitting device unit positioned at an arbitrary position as a first light-emitting device unit, a light-emitting device unit adjacent to the first light-emitting device unit in the first direction as a second light-emitting device unit, a light-emitting device unit adjacent to the first light-emitting device unit in the second direction as a fourth light-emitting device unit, and a light-emitting device unit adjacent to the second light-emitting device unit in the second direction as a third light-emitting device unit;

(a) 4i red light-emitting devices making up the four light-emitting device units are classified into 2i red light-emitting devices having a first luminance value and 2i red light-emitting devices having a second luminance value which is lower than the first luminance value, (b) 8i green light-emitting devices making up the four light-emitting device units are classified into 4i green light-emitting devices having a first luminance value and 4i green light-emitting devices having a second luminance value which is lower than the first luminance value, (c) 4i blue light-emitting devices making up the four light-emitting device units are classified into 2i blue light-emitting devices having a first luminance value and 2i blue light-emitting devices having a second luminance value which is lower than the first luminance value, (d) the classification categories of luminance values which the red light-emitting devices making up the first light-emitting device unit and the third light-emitting device unit have belong to the same classification category, and the classification categories of luminance values which the red light-emitting devices making up the second light-emitting device unit and the fourth light-emitting device unit have belong to the same classification category, (e) the classification category of luminance values of the red light-emitting devices making up the first light-emitting device unit and the third light-emitting device unit, and the classification category of luminance values of the red light-emitting devices making up the second light-emitting device unit and the fourth light-emitting device unit, differ, (f) 2i green light-emitting devices making up each of the first, second, third, and fourth light-emitting device units are made up of green light-emitting devices having a first luminance value and green light-emitting devices having a second luminance value, (g) the classification categories of luminance values which the blue light-emitting devices making up the first light-emitting device unit and the third light-emitting device unit have belong to the same classification category, and the classification categories of luminance values which the blue light-emitting devices making up the second light-emitting device unit and the fourth light-emitting device unit have belong to the same classification category, and (h) the classification category of luminance values of the blue light-emitting devices making up the first light-emitting device unit and the third light-emitting device unit, and the classification category of luminance values of the blue light-emitting devices making up the second light-emitting device unit and the fourth light-emitting device unit, differ.

With the planar light source device and the like according to the first mode, examples of the values of $j_C$ and $j_R$ include, but are not restricted to, 2, 3, 4, and 5. The values of $j_C$ and $j_R$ may be the same value, or may be different values. Specifically, for example, an arrangement may be made wherein $j_C = j_R = 2$, the planar form of the planar light source unit is rectangular, each of the four light-emitting device units are placed at the four corners of the planar light source unit, with the first light-emitting device units and second light-emitting device units being alternately placed in twofold rotational symmetry. Or, an arrangement may be made wherein $j_C = j_R \geq 3$, the planar form of the planar light source unit is rectangular, and the first light-emitting device units and second light-emitting device units are alternately placed in fourfold rotational symmetry. In this case as well, the four light-emitting device units placed at the four corners of the two-dimensional matrix in the $j_C \times j_R$ light-emitting device units arrayed in the two-dimensional matrix are each preferably placed at the four corners of the planar light source unit. Or, in the event that one of $j_C$ and $j_R$ is a value of 3 or greater, and moreover, $j_C \neq j_R$ holds, the first light-emitting device units and second light-emitting device units are alternately placed in twofold rotational symmetry.

With the planar light source device and the like according to the first mode including the above-described preferred forms, partial driving type or division-driving type can be employed as the configuration for individually controlling the light emission state of the planar light source units, i.e., the driving method for the planar light source device or the like, but is not restricted to this, and a method may be employed wherein multiple light-emitting device units or multiple light sources are simultaneously driven under the same driving conditions, or simultaneously driven under different driving conditions.

With the planar light source device and the like according to the first mode or second mode including the above-described preferred forms (hereinafter, these will be collectively referred to as "planar light source device and the like according to an embodiment of the present invention"), $$0.4 \leq I_{R-2}/I_{R-1} \leq 0.9$$

$$0.4 \leq I_{G-2}/I_{G-1} \leq 0.9$$

$$0.4 \leq I_{B-2}/I_{B-1} \leq 0.9$$

may be satisfied, where the first luminance value at a red light-emitting device is $I_{R-1}$ and the second luminance value is $I_{R-2}$, the first luminance value at a green light-emitting device is $I_{G-1}$ and the second luminance value is $I_{G-2}$, and the first luminance value at a blue light-emitting device is $I_{B-1}$ and the second luminance value is $I_{B-2}$.

Note that here, the values of $I_{R-1}$ and $I_{G-1}$ may or may not be equal. In the same way, the values of $I_{G-1}$ and $I_{B-1}$ may or may not be equal, and the values of $I_{B-1}$ and $I_{R-1}$ may or may not be equal. Also, the values of $I_{R-2}$ and $I_{G-2}$ may or may not be equal. In the same way, the values of $I_{G-2}$ and $I_{B-2}$ may or may not be equal, and the values of $I_{B-2}$ and $I_{R-2}$ may or may not be equal.

In the planar light source device and the like according to the first mode including the above-described preferred forms and configurations, the center of gravity of a luminance profile based on red light-emitting devices, the center of gravity of a luminance profile based on green light-emitting devices, and the center of gravity of a luminance profile based on blue light-emitting devices, in each planar light source unit, may generally agree, and in the planar light source device and the like according to the second mode including the above-described preferred forms and configurations, the center of gravity of a luminance profile based on red light-emitting devices, the center of gravity of a luminance profile based on green light-emitting devices, and the center of gravity of a luminance profile based on blue light-emitting devices, in the smallest increment of a planar light source unit configured of the four light-emitting device units, may generally agree. Thus, illumination light emitted from each planar light source unit or smallest increment of planar light source unit can be made to be a more uniform white light. Note that the center of gravity generally agreeing means here that, assuming a planar light source unit or planar light source unit smallest increment in which the planar form is rectangular (having a length $L_1$ for the sides along the first direction and a length $L_2$ for the sides along the second direction), the center of gravity of a luminance profile based on red light-emitting devices, the center of gravity of a luminance profile based on green light-emitting devices, and the center of gravity of a luminance profile based on blue light-emitting devices, are contained within a rectangular region passing through the center of the planar light source unit or planar light source unit smallest increment having a length 0.2 $L_1$ for one side and a length 0.2 $L_2$ for the other side.

In the planar light source device and the like according to the first mode, in the event that $j_C = j_R \geq 3$, the first light-emitting device unit and the second light-emitting device unit are placed alternately and in at least fourfold rotational symmetry with regard to placement. Now, in the even that the planar form of the planar light source units is a regular tetragon, this is normal fourfold rotational symmetry. That is to say, in a Gaussian coordinate system, a light-emitting device unit positioned in the first quadrant $(X_0, Y_0)$ overlaps a light-emitting device unit positioned in the second quadrant $(-Y_0, X_0)$, a light-emitting device unit positioned in the third quadrant $(-X_0, -Y_0)$, and a light-emitting device unit positioned in the fourth quadrant $(Y_0, -X_0)$, by four rotational symmetry operations. However, in the event that the planar form of the planar light source units is rectangular, there is no such spatial overlapping. Still, in a case wherein the first light-emitting device units and second light-emitting device units are arrayed according to a certain placement pattern, rotating the placement pattern 90 degrees on a rotational symmetrical axis in the placement pattern exhibits matching between the placement pattern following rotation and the placement pattern before rotation from the perspective of placement state. The same holds for rotating the placement pattern 180 degrees and rotating the placement pattern 270 degrees as well. This is why the expression has been made of being placed in fourfold rotational symmetry "with regard to placement", to illustrate such a state.

With the planar light source device or liquid crystal display device assembly according to the first mode or second mode including the above-described preferred forms (hereinafter, these may be collectively referred to simply as "an embodiment of the present invention"), light emitting diodes (LED) may be exemplified as light-emitting devices. Depending on situations, light-emitting diodes emitting light of a fourth color, a fifth color, and so on, other than red, green, and blue, may be further provided.

The light-emitting diodes making up the light source may have a so-called face-up structure, or may have a flip-chip structure. That is to say, the light-emitting diodes are configured of a substrate and a light-emitting layer formed on the substrate, and may have a structure where light emitted from the light-emitting layer is externally emitted, or may have a structure where light emitted from the light-emitting layer is externally emitted through the substrate. More specifically, light-emitting diodes have a layered structure of, for example, a first compound semiconductor layer formed of a compound semiconductor layer having a first conductivity type (e.g., n-type) that is formed on the substrate, an active layer formed on the first compound semiconductor layer, and a second compound semiconductor layer formed of a compound semiconductor layer having a second conductivity type (e.g., p-type) that is formed on the active layer, and includes a first electrode which is electrically connected to the first compound semiconductor layer, and a second electrode which is electrically connected to the second compound semiconductor layer. Layers making up the light-emitting diodes may be configured from compound semiconductor materials according to the related art, dependent on light wavelength.

In the event of using a configuration wherein light emitted from the light-emitting diodes is directly input to the liquid crystal display device positioned above, i.e., in the event that light is emitted solely along the z-axial direction from the light-emitting diode, there may be cases wherein luminance irregularities occur at the planar light source device and so forth. To avoid such a phenomenon, a two-dimensional direction emission configuration can be exemplified, wherein a light-emitting diode assembly where light extraction lenses are attached to the light-emitting diodes is used as the light source, with a part of the light emitted from the light-emitting diodes is fully reflected at the top face of the light extraction lenses, and primarily emitted in the horizontal direction of the light extraction lenses.

The planar light source device and the like according to an embodiment of the present invention may include a light diffusion plate, and further a diffusion sheet, prism sheet, polarization conversion sheet, or a like optical function sheet group, or a reflection sheet. The optical function sheet group may be configured may be configured of various types of sheets placed with spacing therebetween, or may be configured integrally having been layered. The light diffusion plate or optical function sheet group is placed between the planar light source device or the like and the liquid crystal display device. Examples of a material for configuring the light diffusion plate include polycarbonate resin (PC), polystyrene resin (PS), methacrylic resin, "ZENOR" manufactured by Zeon Corporation which is a norbornene polymer resin, and like cycloolefin resins.

Planar light source units and planar light source units may be of a configuration partitioned by partitions. Partitions control transmission of light emitted from the light sources making up the planar light source units, or control reflection, or control transmission and reflection. Note that in this case, one planar light source unit is surrounded by four partitions, or is surrounded by one side face of the casing making up the planar light source device and three partitions, or is surrounded by two side faces of the casing and two partitions. Specific examples of materials for configuring the partitions may include non-transparent materials as to light emitted from the light sources provided to the planar light source units, such as acrylic resin, polycarbonate resin, ABS resin, or transparent materials as to light emitted from the light sources provided to the planar light source units, such as Poly(methyl methacrylate) resin (PMMA), polycarbonate resin (PC), polyacrylate resin (PAR), polyethylene terephthalate resin (PET), and glass. The partition surfaces may be provided with light diffusion/reflection functions, or may be provided with mirror reflection functions. In order to provide light diffusion/reflection functions on the partition surfaces, the partition surfaces may have texture formed by sandblasting, or textured film (light diffusion film) applied to the partition surfaces. Also, in order to provide the partition surfaces with mirror reflection functions, a light reflecting film may be applied to the partition surfaces, or a light reflection layer may be formed on the partition surfaces by plating, for example.

In a planar light source device or the like, an optical sensor may be provided to measure the light emission state of the light source (specifically, luminance of the light source, or chromaticity of the light source, or luminance and chromaticity of the light source, for example). A minimum of one is sufficient for the number of optical sensors, but a configuration wherein one optical sensor is placed for each planar light source unit is preferable from the perspective of measuring the light emission state of each planar light source unit in a sure manner. Photodiodes and CCD devices according to the related art can be given as examples of optical sensors.

A transmissive liquid crystal display device is configured of a front panel having a transparent first electrode, a rear panel having a transparent second electrode, and liquid crystal material positioned between the front panel and the rear panel. Note that the liquid crystal display device can be formed as a transmissive type color liquid crystal display device.

More specifically, the front panel is configured of a first substrate, a transparent first electrode (also called a common electrode, formed of ITO, for example) provided on the inner face of the first substrate, and a polarization filmed provided on the outer face of the first substrate. Further, with a transmissive color liquid crystal display device, a color filter is provided on the inner face of the first substrate, covered with an overcoat layer formed of acrylic resin or epoxy resin. The color filter is generally configured of a black matrix (formed of chromium for example) for shielding light from gaps between colored patterns, and a blue, green, and red colored layer facing each sub-pixel, formed by dyeing, pigment dispersion, printing, or electrodeposition, or the like. The colored layer may be formed of resin material, or colored with pigment. The colored layer pattern is matched with the array state (array pattern) of the sub-pixels, and examples thereof include a delta array, stripe array, diagonal array, and rectangular array. The front panel has a configuration wherein the transparent first electrode is formed on the overcoat layer. Note that an orientation film is formed on the transparent first electrode. On the other hand, more specifically, the rear panel is configured, for example, of a second substrate, switching devices formed on the inner face of the second substrate, transparent second electrodes regarding which conducting/non-conducting is controlled by the switching devices (also called pixel electrodes, formed of ITO for example), and a polarization film provided on the outer face of the second substrate. An orientation film is formed on the entire face, including the transparent second electrodes. The various members and liquid crystal materials making up liquid crystal display devices including this transmissive color liquid crystal display device can be configured from members and materials according to the related art. Examples of the switching devices can include three-terminal devices such as MOS-FETs or thin-film transistors (TFT) formed on a single-crystal silicon semiconductor substrate, two-terminal devices such as MIM (Metal-Insulation-Metal) devices, varistor devices, diodes, and the like. The driving method of the liquid crystal material should be a driving method suitable for the liquid crystal material being used.

Examples of the first substrate and second substrate can include glass substrates, glass substrates with insulation film formed on the surface, quartz substrates, quartz substrates with insulation film formed on the surface, and semiconductor substrates with insulation film formed on the surface, but from the perspective of lowering manufacturing costs, glass substrates or glass substrates with insulation film formed on the surface are preferably used. Examples of glass substrates can include high distortion point glass, soda-lime glass ($Na_2O.CaO.SiO_2$), borosilicate glass ($Na_2O.B_2O_3.SiO_2$), forsterite ($2MgO.SiO_2$), lead glass ($Na_2O.PbO.SiO_2$), and non-alkali glass. Alternatively, examples may include polymethyl methacrylate(poly(methyl methacrylate), PMMA), polyvinyl alcohol (PVA), polyvinyl phenol (PVP), polyether sulfone (PES), polyimide, polycarbonate (PC), polyethylene terephthalate (PET), and like organic polymers (having a form of a polymer material such as plastic film, plastic sheets, plastic substrates, or the like formed of polymer material and having flexibility)

A region which is an overlapping region of the transparent first electrode and transparent second electrode and includes a liquid crystal cell is equivalent to one sub-pixel. With a transmissive color liquid crystal display device, a red light-emitting sub-pixel (also referred to as sub-pixel [R]) making up each pixel is configured of a combination of the liquid crystal cell configuring this region and the color filter transmitting red light, a green light-emitting sub-pixel (also referred to as sub-pixel [G]) is configured of a combination of the liquid crystal cell configuring this region and the color filter transmitting green light, and a blue light-emitting sub-pixel (also referred to as sub-pixel [B]) is configured of a combination of the liquid crystal cell configuring this region and the color filter transmitting blue light. The placement pattern of the sub-pixel [R], sub-pixel [G], and sub-pixel [B] matches the placement pattern of the color filter described above. Note that pixels are not restricted to a configuration wherein the three types of sub-pixels, sub-pixel [R], sub-pixel [G], and sub-pixel [B], are configured as a single set of [R, G, B], and for example may be configured of a set wherein one type or multiple types of sub-pixels are added to the three types of sub-pixels [R, G, B] (for example, a set wherein a sub-pixel emitting white light is added to improve luminance, a set wherein a sub-pixels emitting complementary colors are added to broaden the range or color reproduction, a set wherein a sub-pixel emitting yellow is added to broaden the range of color reproduction, a set wherein a sub-pixel emitting magenta is added to broaden the range of color reproduction, a set wherein sub-pixels emitting yellow and cyan are added to broaden the range of color reproduction). In the event of adding sub-pixels to broaden the gamut, fourth light-emitting devices and fifth light-emitting devices may also be provided to the light-emitting devices making up the planar light source unit as well.

In the division driving method, the light transmissivity of the sub-pixels (also called aperture ratio) Lt, luminance of the portion of the display region corresponding to sub-pixels (display luminance) y, and luminance of the planar light source unit (light source luminance) Y are defined as follows.

$Y_1$: The maximum luminance for example, of the light source luminance for example, and hereinafter may be referred to as light source luminance—first stipulated value.

$Lt_1$: The maximum luminance for example, of the light transmissivity (aperture ratio) of the sub-pixels at the planar light source unit, and hereinafter may be referred to as light transmissivity—first stipulated value.

$Lt_2$: The light transmissivity (aperture ratio) of sub-pixels assuming that the sub-pixels are supplied with control signals corresponding to driving signals having a value equal to an in-display-region unit—driving signal maximum value $x_{U\text{-}max}$ which is the maximum value of the values of driving signals input to the driving circuit for driving all of the pixels making up the driving region unit, and hereinafter may be referred to as light transmissivity—second stipulated value when the light source luminance is the light source luminance—first stipulated value $Y_1$. Note that $0 \leq Lt_2 \leq Lt_1$ holds.

$y_2$: A display luminance obtained assuming that the light source luminance is the light source luminance—first stipulated value $Y_1$ and the light transmissivity (aperture ratio) of the sub-pixels is the light transmissivity—second stipulated value $Lt_2$, and hereinafter may be referred to as display luminance—second stipulated value.

$Y_2$: A light source luminance of the planar light source unit for setting the luminance of the sub-pixels to the display luminance—second stipulated value ($y_2$), when assuming that control signals corresponding to driving signals having a value equal to the in-display-region unit—driving signal maximum value $x_{U\text{-}max}$ are provided to the sub-pixels and further supposing that the light transmissivity (aperture ratio) at the sub-pixels at this time has been corrected to the light transmissivity—first stipulated value $Lt_1$. Note however, that there are cases wherein the light source luminance $Y_2$ may be subjected to correction taking into consideration the effect that the light source luminance of each planar light source unit has on the light source luminance of other planar light source units.

At the time of division driving of the planar light source device, the luminance of the light sources making up the planar light source units corresponding to the display region units is controlled by a driving circuit so as to obtain pixel luminance when assuming that the pixels are supplied with control signals corresponding to driving signals having values equal to the in-display-region unit—driving signal maximum value $x_{U\text{-}max}$ (the display luminance—second stipulated value $y_2$ in the light transmissivity—first stipulated value $Lt_1$). Specifically, the light source luminance $Y_2$ can be controlled (e.g., so as to be reduced) such that the display luminance $y_2$ is obtained when the light transmissivity (aperture ratio) of the sub-pixels is set to, for example, the light transmissivity—first stipulated value $Lt_1$, for example. That is to say, for example, the light source luminance $Y_2$ of the planar light source unit can be controlled for each frame (called image display frame for the sake of ease) of the displayed image on the liquid crystal display device, so as to satisfy the following Expression (1). Note that the relation of $Y_2 \leq Y_1$ holds.

$$Y_2 \cdot Lt_1 = Y_1 \cdot Lt_2$$

When writing the number of pixels $M_0 \times N_0$ arrayed in the two-dimensional matrix as $(M_0, N_0)$, several resolutions for image display devices can be specifically exemplarily illustrated, such as VGA (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), and further, (1920, 1035), (720, 480), (1280, 960), and so forth, but is not restricted to these values. Note that when employing the division driving method, the relation between the values of $(M_0, N_0)$ and the values of $(P, Q)$ is not restricted to, but can be exemplarily illustrated in the following Table 1. As for the number of pixels making up a single display region unit, 20×20 through 320×240, preferably 50×50 through 200×200 can be exemplarily illustrated. The number of pixels in the display regions units may be set, or may be different.

TABLE 1

|  | Value of P | Value of Q |
| --- | --- | --- |
| VGA (640, 480) | 2-32 | 2-24 |
| S-VGA (800, 600) | 3-40 | 2-30 |
| XGA (1024, 768) | 4-50 | 3-39 |
| APRC (1152, 900) | 4-58 | 3-45 |
| S-XGA (1280, 1024) | 4-64 | 4-51 |
| U-XGA (1600, 1200) | 6-80 | 4-60 |
| HD-TV (1920, 1080) | 6-86 | 4-54 |
| Q-XGA (2048, 1536) | 7-102 | 5-77 |
| (1920, 1035) | 7-64 | 4-52 |
| (720, 480) | 3-34 | 2-24 |
| (1280, 960) | 4-64 | 3-48 |

The driving circuit for driving the liquid crystal display device and planar light source device has a planar light source device control circuit and planar light source unit driving circuit configured of, for example, a light-emitting device driving circuit, computing circuit, storage device (memory) and so forth, and a liquid crystal display device driving circuit configured of a circuit according to the related art such as a timing controller or the like. Control of luminance of the display region portion (display luminance) and luminance of planar light source units (light source luminance) is performed for each image display frame. Note that the number of image information sent to the driving circuit as electric signals every second (images per second) is the frame frequency (frame rate), and the inverse of the frame frequency is frame time (unit: seconds).

With the planar light source device and the like according to the first mode, the 2i green light-emitting devices making up each light-emitting device unit are configured of a green light-emitting device having a first luminance value and a green light-emitting device having a second luminance value, and with the planar light source device and the like according to the second mode, the 2i green light-emitting devices making up each of the first, second, third, and fourth light-emitting device units are configured of a green light-emitting device having a first luminance value and a green light-emitting device having a second luminance value. As a result, occurrence of luminance irregularities of a short cycle among light-emitting device units can be suppressed in a sure manner.

Also, employing division driving (partial driving) at the planar light source device, and controlling the luminance of the light sources making up the planar light source units corresponding to the display control units with a driving circuit so as to obtain pixel luminance assuming that the pixels are supplied with control signals corresponding to driving signals having values equal to the in-display-region unit—driving signal maximum value $x_{U\text{-}max}$ (the display luminance—second stipulated value $y_2$ in the light transmissivity—first stipulated value $Lt_1$), not only enables electric power consumption of the planar light source device to be reduced, but further, white level can be increased and black level can be decreased to obtain a high contrast ratio (the luminance ratio between an all-black display portion and an all-white display portion on the display face of a color liquid crystal display device, not including external light reflection or the like), and brightness within a desired display region can be enhanced, whereby quality of image display can be improved.

BRIEF DESCRIPTION OF THE DRAWINGS

FIGS. 5A and 5B are diagrams schematically illustrating the placement state of the first light-emitting device units and second light-emitting device units in planar light source units according to a second embodiment and third embodiment, respectively;

FIG. 6A is a diagram schematically illustrating the placement state of the first light-emitting device units and second light-emitting device units in a planar light source unit according to a fourth embodiment, and FIG. 6B is a diagram schematically illustrating the placement state of the first light-emitting device units, second light-emitting device units, and third light-emitting device units in a modification of the planar light source unit according to the second embodiment;

FIG. 10 is a schematic cross-sectional diagram of a color liquid crystal display device;

FIG. 15 is a graph illustrating luminance irregularities along the X direction (horizontal direction in screen, and first direction) at the center of the Y direction (vertical direction in screen, and second direction) of a color liquid crystal display device according to the related art.

DESCRIPTION OF THE PREFERRED EMBODIMENTS

Figure 1A:
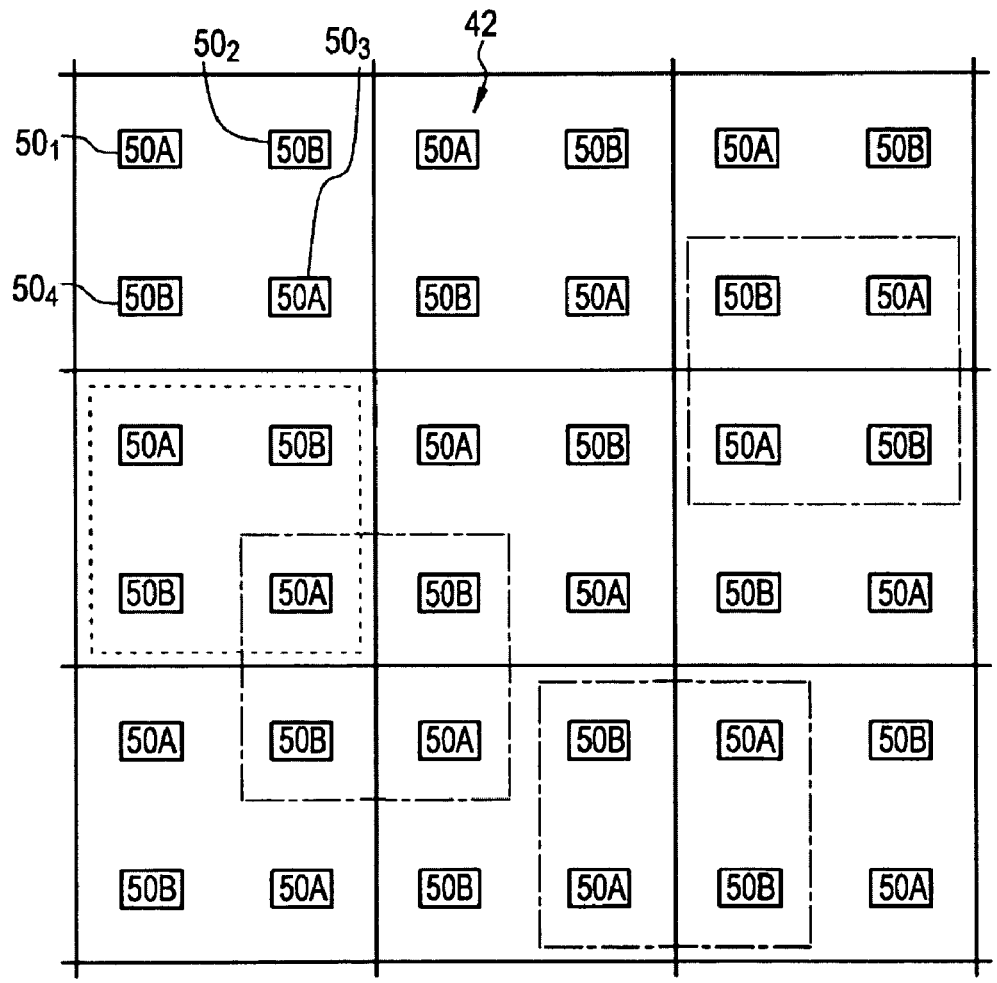
FIG. 1A is a diagram schematically illustrating the placement state of first light-emitting device units and second light-emitting device units in planar light source units according to a first embodiment.

The present invention will now be described based on embodiments, with reference to the drawings.

First Embodiment

The first embodiment relates to a planar light source device and liquid crystal display device assembly according to the first mode and second mode. As shown in the conceptual diagram in FIG. 7, the liquid crystal display device assembly according to the first embodiment includes (i) a transmissive liquid crystal display device having a display region 11 configured of pixels arrayed in a two-dimensional matrix (a color liquid crystal display device 10 in the first embodiment); and (ii) a planar light source device 40 configured to illuminate the transmissive liquid crystal display device (color liquid crystal display device 10) from the rear side.

The color liquid crystal display device 10 has a display region 11 with $M_0$ pixels arrayed in a first direction, and $N_0$ pixels arrayed in a second direction orthogonal to the first direction, for a total of $M_0 \times N_0$ pixels in a two-dimensional matrix. Now, we will assume the display region 11 having been divided into P×Q (where P and Q are each integers of 2 or greater, and may be the same value or may be different values, depending on the specifications of the color liquid crystal display device 10) hypothetical display region units 12. Each display region unit 12 is configured of multiple pixels. Specifically, for example, in the event that the image display resolution satisfies the HD-TV standard, and the number of pixels $M_0 \times N_0$ arrayed in the two-dimensional matrix is written as ($M_0$, $N_0$), this is (1920, 1080), for example. Also, the display region 11 (indicated by the single-dot broken line in FIG. 7) configured of pixels arrayed in the two-dimensional matrix is divided into P×Q hypothetical display region units 12 (the boundaries thereof indicated by dotted lines). The value of (P, Q) is, for example, (19, 21). However, the number of display region units 12 in FIG. 7 (and of later-described planar light source units 42) differs from this value, for the sake of simplification of the drawings. Each display region unit 12 is configured of multiple (M×N) pixels, and the number of pixels making up a single display region unit 12 is, for example, approximately 10,000. Each pixel is configured of a set of multiple sub-pixels each which emit a different color light. More specifically, each pixel is configured of three types of sub-pixels of a red light-emitting sub-pixel (sub-pixel [R]), green light-emitting sub-pixel (sub-pixel [G]), and blue light-emitting sub-pixel (sub-pixel [B]). The color liquid crystal display device 10 is driven in line-sequence. More specifically, the color liquid crystal display device 10 has scanning electrodes (extending in a first direction) and data electrodes (extending in the second direction) intersecting in matrix fashion, with scanning signals being input to scanning electrodes to select scanning electrodes so as to scan this, and displays an image based on data signals (signals based on control signals) input to the data electrodes, thereby configuring a screen.

A division driving immediately-below type planar light source device (backlight) 40 is made up of P×Q planar light source units 42 corresponding to the P×Q display region units 12 which are the P×Q hypothetical display region units 12 into which the display region 11 is assumed to be divided into, with each planar light source unit 42 illuminating the display region unit 12 corresponding to the planar light source unit 42 from behind with white light. Now, the light illumination states of the P×Q planar light source units 12 are individually controlled. Note that while the planar light source device 40 is positioned below the color liquid crystal display device 10, but in FIG. 7, the color liquid crystal display device 10 and the planar light source device 40 are shown separately. The light source is formed of light-emitting devices (light-emitting diodes) 51 driven based on pulse width modulation (PWM) control. Increase/decrease in luminance of the planar light source unit 42 is performed by increasing/decreasing the duty ratio in the pulse width modulation control of the light-emitting devices (light-emitting diodes) 51 making up the planar light source units 42.

The first embodiment will be described following the expressions of the planar light source device and the like according to the first mode as follows.

The light source provided to each planar light source unit 42 has $j_C \times j_R$ (where $j_C$ and $j_R$ are integers of 2 or greater) light-emitting device units 50. The light-emitting device units 50 in each planar light source unit 42 are classified into at least first light-emitting device units 50A and second light-emitting device units 50B. Specifically, with the first embodiment, the light-emitting device units 50 in each planar light source unit 42 are classified into the two light-emitting device units of first light-emitting device units 50A and second light-emitting device units 50B. Here, in the first embodiment, $j_C = j_R = 2$ has been set. Each light-emitting device unit 50 is configured of i (where i is an integer of 1 or greater) red light-emitting devices (red light-emitting diodes) 51R which emit red light, 2i green light-emitting devices (green light-emitting diodes) 51G which emit green light, and i blue light-emitting devices (blue light-emitting diodes) 51B which emit blue light. Specifically, in the first embodiment, i=1, and each light-emitting device unit 50 is configured of one red light-emitting device (red light-emitting diodes) 51R which emits red light, two green light-emitting devices (green light-emitting diodes) 51G which emit green light, and one blue light-emitting device (blue light-emitting diodes) 51B which emits blue light.

Each planar light source unit 42 is configured as follows.

(A) red light-emitting devices 51R are classified into red light-emitting devices $51R_1$ having a first luminance value, and red light-emitting devices $51R_2$ having a second luminance value lower than that of the first luminance value, (B) green light-emitting devices 51G are classified into green light-emitting devices $51G_1$ having a first luminance value, and green light-emitting devices $51G_2$ having a second luminance value lower than that of the first luminance value, and (C) blue light-emitting devices 51B are classified into blue light-emitting devices $51B_1$ having a first luminance value, and blue light-emitting devices $51B_2$ having a second luminance value lower than that of the first luminance value.

Also, (D) the classification category of the luminance value of the red light-emitting devices 51R making up the first light-emitting device unit 50A differs from the classification category of the luminance value of the red light-emitting devices 51R making up the second light-emitting device unit 50B, (E) the 2i (specifically, two) green light-emitting devices 51G making up each green light-emitting device unit 50A and 50B are configured of green light-emitting devices $51G_1$ having a first luminance value, and green light-emitting devices $51G_2$ having a second luminance value, and (F) the classification category of the luminance value of the blue light-emitting devices 51B making up the first light-emitting device unit 50A differs from the classification category of the luminance value of the blue light-emitting devices 51B making up the second light-emitting device unit 50B.

Moreover, (G) the first light-emitting device unit 50A and the second light-emitting device unit 50B are placed in at least twofold rotational symmetry.

Note that the above items (A) through (G) may be referred to as rules (A) through (G).

Figure 1B:
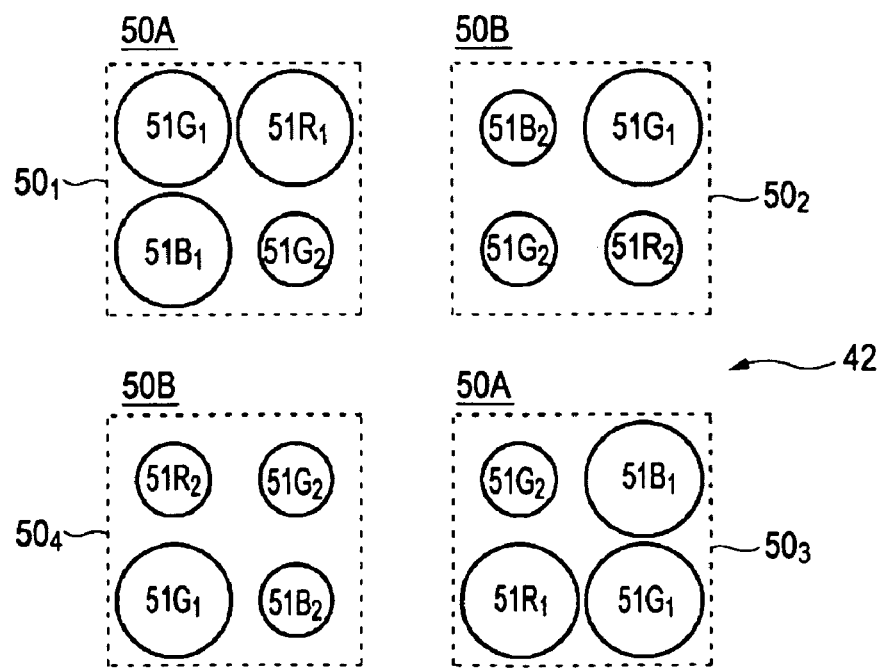
FIG. 1B is a diagram schematically illustrating the first light-emitting device units and second light-emitting device units in one planar light source unit, and further the placement state of light-emitting devices making up the first light-emitting device units and second light-emitting device units.

More specifically, with the first embodiment, the red light-emitting device 51R making up the first light-emitting device unit 50A has the first luminance value, and the blue light-emitting device 51B has the first luminance value. On the other hand, the red light-emitting device 51R making up the second light-emitting device unit 50B has the second luminance value, and the blue light-emitting device 51B has the second luminance value. FIG. 1A schematically illustrates the placement state of the first light-emitting device units 50A and second light-emitting device units 50B in each of nine planar light source units 42, and FIG. 1B schematically illustrates the placement state of the first light-emitting device units 50A and second light-emitting device units 50B in one planar light source unit 42, and further schematically illustrates the placement state of the light-emitting devices configuring the first light-emitting device units 50A and second light-emitting device units 50B. Note that in FIG. 1A, the boundary between the planar light source unit 42 and planar light source unit 42 is indicated by solid lines, and in FIG. 1B the first light-emitting device unit 50A and second light-emitting device unit 50B are indicated by dotted squares.

Now, with the first embodiment, $j_C=j_R=2$ for the first light-emitting device unit 50A and second light-emitting device unit 50B, and accordingly these are placed alternately and in twofold rotational symmetry. Also, the planar shape of the planar light source unit 42 is rectangular, and each of the four light-emitting device units 50A and 50B are placed in the four corners of the planar light source unit 42.

With the planar light source units 42 having a rectangular planar shape illustrated in FIGS. 1A and 1B, for the sake of ease of description, the first light-emitting device unit 50A placed at the upper left will be referred to as the first light-emitting device unit $50_1$, the second light-emitting device unit 50B placed at the upper right will be referred to as the second light-emitting device unit $50_2$, the first light-emitting device unit 50A placed at the lower right will be referred to as the third light-emitting device unit $50_3$, and the second light-emitting device unit 50B placed at the lower left will be referred to as the fourth light-emitting device unit $50_4$. Now, as shown in FIG. 1B, the placement state of four light-emitting devices $51G_1$, $51G_2$, $51R_1$, and $51B_1$, configuring the first light-emitting device unit $50_1$, is in twofold rotational symmetry as to the placement state of four light-emitting devices $51G_1$, $51G_2$, $51R_1$, and $51B_1$, configuring the third light-emitting device unit $50_3$, and the placement state of four light-emitting devices $51G_1$, $51G_2$, $51R_2$, and $51B_2$, configuring the second light-emitting device unit $50_2$, is in twofold rotational symmetry as to the placement state of four light-emitting devices $51G_1$, $51G_2$, $51R_2$, and $51B_2$, configuring the fourth light-emitting device unit $50_4$, but does not have to be in rotational symmetry.

Alternatively, the first embodiment will be described following the expressions of the planar light source device and the like according to the second mode as follows.

The planar light source unit according to the first embodiment includes a total of $P \times Q \times j_C \times j_R$ (where P and Q are positive integers, $j_C$ and $j_R$ are integers or 2 or greater, and $j_C=j_R=2$ with the first embodiment) light-emitting device units 50 of $P \times j_C$ in the first direction and $Q \times j_R$ in the second direction. Each light-emitting device unit 50 is configured of i (where i is an integer of 1 or greater) red light-emitting devices 51R which emit red light, 2i green light-emitting devices 51G which emit green light, and i blue light-emitting devices 51B which emit blue light. Here, in the first embodiment the value of i is "1".

Here, we will refer to a light-emitting device unit positioned at an arbitrary position as a first light-emitting device unit $50_1$, a light-emitting device unit adjacent to the first light-emitting device unit $50_1$ in the first direction as a second light-emitting device unit $50_2$, a light-emitting device unit adjacent to the first light-emitting device unit $50_1$ in the second direction as a fourth light-emitting device unit $50_4$, and a light-emitting device unit adjacent to the second light-emitting device unit $50_2$ in the second direction as a third light-emitting device unit $50_3$. Note that in FIG. 1A, a certain set of first light-emitting device unit $50_1$ through fourth light-emitting device unit $50_4$ (the smallest increment of planar light source units) is encompassed with a dotted line, and another set of first light-emitting device unit $50_1$ through fourth light-emitting device unit $50_4$ (also the smallest increment of planar light source units) is encompassed with a single-dot broken line.

Here, (a) 4i (specifically, four) red light-emitting devices 51R, making up the four light-emitting device units $50_1$, $50_2$, $50_3$, and $50_4$, are classified into 2i (specifically, two) red light-emitting devices $51R_1$ having a first luminance value and 2i (specifically, two) red light-emitting devices $51R_2$ having a second luminance value which is lower than the first luminance value, (b) 8i (specifically, eight) green light-emitting devices 51G making up the four light-emitting device units $50_1$, $50_2$, $50_3$, and $50_4$, are classified into 4i (specifically, four) green light-emitting devices $51G_1$ having a first luminance value and 4i (specifically, four) green light-emitting devices $51G_2$ having a second luminance value which is lower than the first luminance value, and (c) 4i (specifically, four) blue light-emitting devices 51B, making up the four light-emitting device units $50_1$, $50_2$, $50_3$, and $50_4$, are classified into 2i (specifically, two) blue light-emitting devices $51B_1$ having a first luminance value and 2i (specifically, two) blue light-emitting devices $51B_2$ having a second luminance value which is lower than the first luminance value.

Further, (d) the classification categories of luminance values which the red light-emitting devices 51R making up the first light-emitting device unit $50_1$ and the third light-emitting device unit $50_3$ have belong to the same classification category, and the classification categories of luminance values which the red light-emitting devices 51R making up the second light-emitting device unit $50_2$ and the fourth light-emitting device unit $50_4$ have belong to the same classification category, and (e) the classification category of luminance values of the red light-emitting devices 51R making up the first light-emitting device unit $50_1$ and the third light-emitting device unit $50_3$, and the classification category of luminance values of the red light-emitting devices 51R making up the second light-emitting device $50_2$ unit and the fourth light-emitting device unit $50_4$, differ.

Also, (f) 2i (specifically, two) green light-emitting devices 51G making up each of the first, second, third, and fourth light-emitting device units $50_1$, $50_2$, $50_3$, and $50_4$, are made up of green light-emitting devices $51G_1$ having a first luminance value and second green light-emitting devices $51G_2$ having a second luminance value.

Further, (g) the classification categories of luminance values which the blue light-emitting devices 51B making up the first light-emitting device unit $50_1$ and the third light-emitting device unit $50_3$ have belong to the same classification category, and the classification categories of luminance values which the blue light-emitting devices 51B making up the second light-emitting device unit $50_2$ and the fourth light-emitting device unit $50_4$ have belong to the same classification category, and (h) the classification category of luminance values of the blue light-emitting devices 51B making up the first light-emitting device unit $50_1$ and the third light-emitting device unit $50_3$, and the classification category of luminance values of the blue light-emitting devices 51B making up the second light-emitting device unit $50_2$ and the fourth light-emitting device unit $50_4$, differ.

Note that the above items (a) through (h) may be referred to as rules (a) through (h).

Now, with the first luminance value at the red light-emitting devices 51R as $I_{R-1}$ and the second luminance value as $I_{R-2}$, the first luminance value at the green light-emitting devices 51G as $I_{G-1}$ and the second luminance value as $I_{G-2}$, and the first luminance value at the blue light-emitting devices 51B as $I_{B-1}$ and the second luminance value as $I_{B-2}$, the average values of $I_{R-2}/I_{R-1}$, $I_{G-2}/I_{G-1}$, and $I_{B-2}/I_{B-1}$, are as follows.

$I_{R-2}/I_{R-1}=0.63$ $I_{G-2}/I_{G-1}=0.56$ $I_{B-2}/I_{B-1}=0.63$

The center of gravity of a luminance profile based on red light-emitting devices 51R, the center of gravity of a luminance profile based on green light-emitting devices 51G, and the center of gravity of a luminance profile based on blue light-emitting devices 51B, in the planar light source unit 42, generally agree. Alternatively, the center of gravity of a luminance profile based on red light-emitting devices 51R, the center of gravity of a luminance profile based on green light-emitting devices 51G, and the center of gravity of a luminance profile based on blue light-emitting devices 51B, in the smallest increment of a planar light source unit configured of the four light-emitting device units $50_1$, $50_2$, $50_3$, $50_4$, generally agree.

Figure 3:
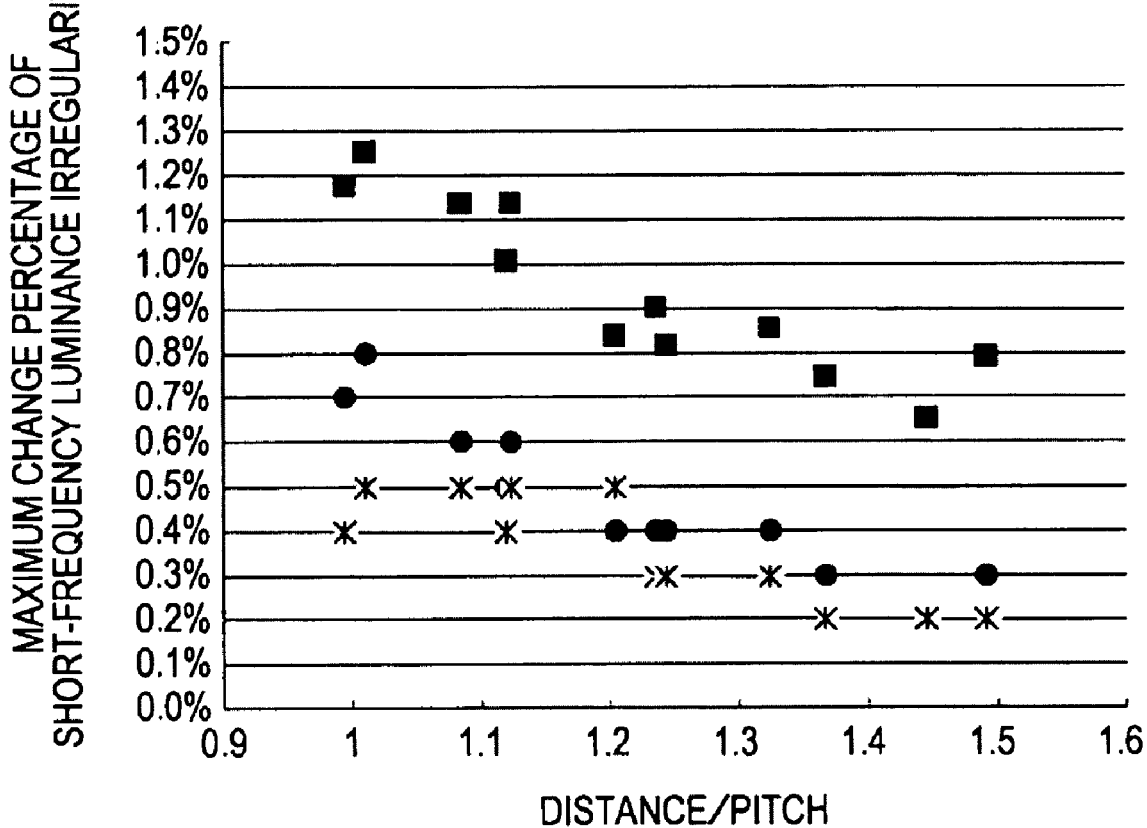
FIG. 3 is a graph illustrating the results of simulating luminance irregularities in a case of employing a planar light source unit according the first embodiment, and luminance irregularities in a case of employing a comparative example 1-A and a comparative example 1-B.
Figure 14A:
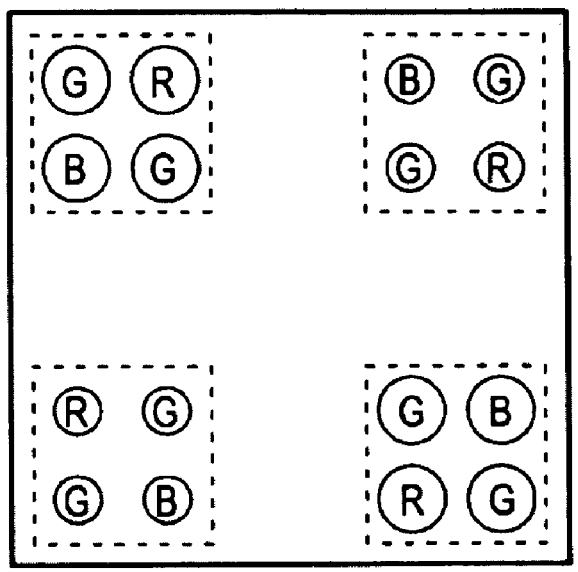
FIG. 14A and FIG. 14B are diagrams schematically illustrating the placement state of light-emitting device units in the planar light source unit according to comparative example 1-A and comparative example 1-B.
Figure 14B:
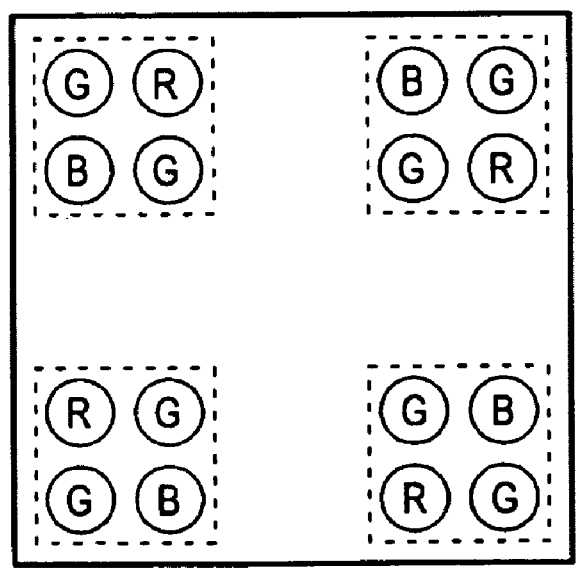
Figure 16:
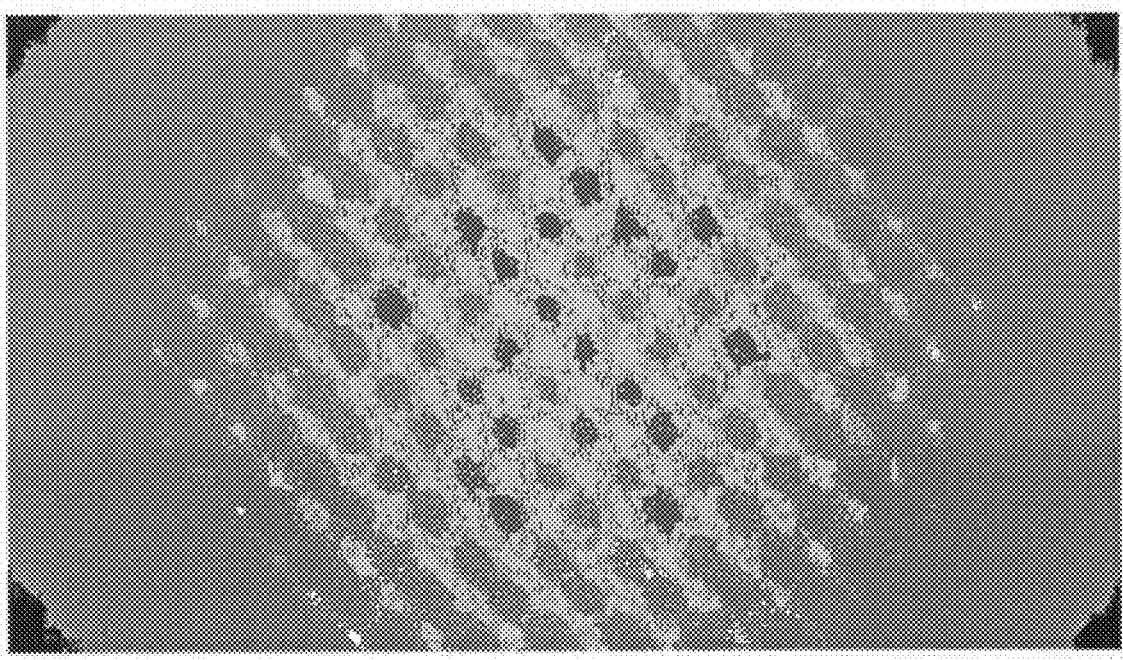
FIG. 16 is a photograph illustrating a state wherein luminance irregularities have occurred on a color liquid crystal display device according to the related art.

The results of simulation of luminance irregularities in the event of using the planar light source unit 42 according to the first embodiment (maximum change rate of short-cycle luminance irregularities) are shown in FIG. 3 as filled circles. Also shown in FIG. 3 as a comparative example 1-A are the simulation results of the luminance irregularities with a planar light source unit employing a placement shown in FIG. 14A, with filled squares. Further shown in FIG. 3, as a comparative example 1-B, are the simulation results of the luminance irregularities with a planar light source unit employing a placement shown in FIG. 14B, with asterisks (*). In the placement shown in FIG. 14B, all light-emitting device units are configured of red light-emitting devices having a first luminance value, green light-emitting devices having a first luminance value, and blue light-emitting device having a first luminance value. Now, the horizontal axis in FIG. 3 is a value obtained by dividing the distance from a later-described reflective sheet 75 to a light diffusion plate 71 by the pitch of light-emitting device units.

It can be found from FIG. 3 that the luminance irregularity of the planar light source unit 42 in the first embodiment is approximately equal to the luminance irregularity of the planar light source unit in the comparative example 1-B (i.e., the luminance irregularity of the planar light source unit configured from light-emitting devices having the same emission luminance), and is markedly improved over the luminance of the planar light source unit in the comparative example 1-A.

Figure 4:
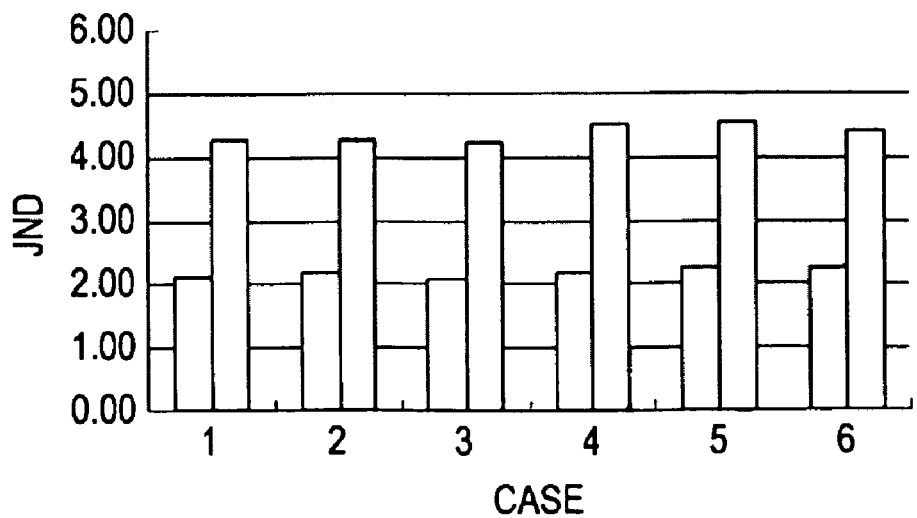
FIG. 4 is a bar graph illustrating the results of evaluating recognition threshold (Just Noticeable Difference, JND) by changing the emission wavelength of the blue light-emitting device with the planar light source devices according the first embodiment, comparative example 1-A, and comparative example 1-B.

Further, with the planar light source device according to the first embodiment, the emission wavelength of the blue light-emitting devices was changed, and the recognition threshold (Just Noticeable Difference, JND) was evaluated. The results are shown in FIG. 4 as "case 1" and "case 4". Also, with the planar light source device according to comparative example 1-A, the emission wavelength of the blue light-emitting devices was changed, and the recognition threshold was evaluated. The results are shown in FIG. 4 as "case 2" and "case 5". Further, with the planar light source device according to comparative example 1-B, the emission wavelength of the blue light-emitting devices was changed, and the recognition threshold was evaluated. The results are shown in FIG. 4 as "case 3" and "case 6". Note that in "case 1", "case 2", and "case 3", the emission wavelength of the red light-emitting devices, the emission wavelength of the green light-emitting devices, and the emission wavelength of the blue light-emitting devices, are each classified as "short emission wavelengths", while in "case 4," "case 5", and "case 6", the emission wavelength of the red light-emitting devices, and the emission wavelength of the green light-emitting devices, are classified as "short emission wavelengths" and the emission wavelength of the blue light-emitting devices is classified as "long emission wavelength". FIG. 4 shows that no difference in recognition threshold of the illumination light emitted from the planar light source device was observed even if the emission wavelength was changed. Note that the left side of the bar graphs in each case indicate the average value of 1000 planar light source devices, and the right side indicate the value of (average value +6σ). Refer to "Shikisai Kogaku (Color Engineering)" (by Noboru Ohta) Second Edition, published by Tokyo Denki University Press, pp 80, 116, regarding recognition threshold.

Figure 2:
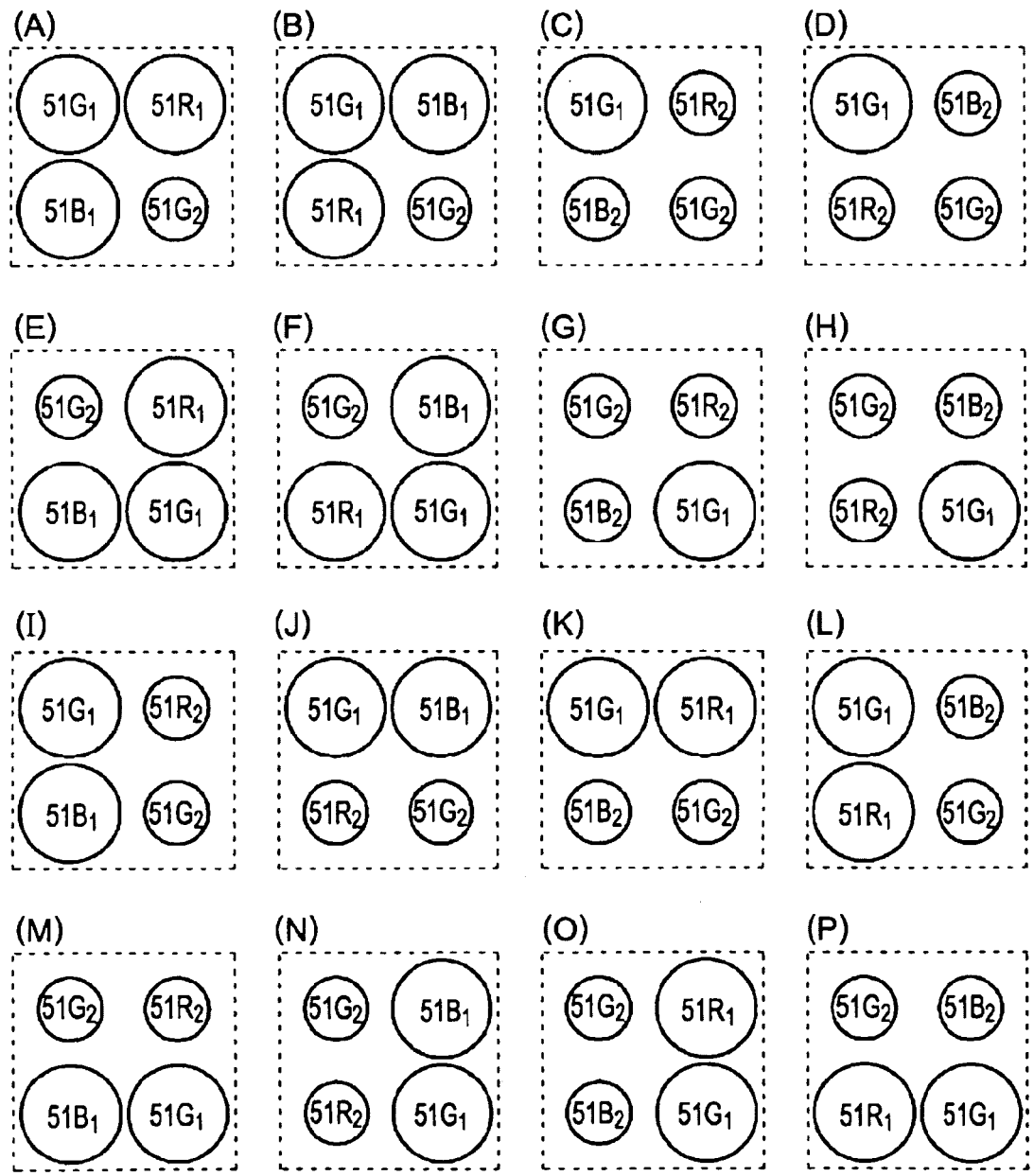
FIG. 2 is a diagram schematically illustrating (A) through (P) examples of arrays of a red light-emitting device, green light-emitting devices, and a blue light-emitting device, in a single light-emitting device unit.

In FIG. 2, the examples (A) through (P) schematically illustrate, for example, arrays of the red light-emitting devices $51R_1$ and $51R_2$, green light-emitting devices $51G_1$ and $51G_2$, and blue light-emitting devices $51B_1$ and $51B_2$, in the light-emitting device unit $50_1$. As for the remaining light-emitting device units $50_2$, $50_3$, and $50_4$, a suitable one should be selected from the light-emitting device units shown in (A) through (P) in FIG. 2, in accordance with the above-described rules (A) through (G) or rules (a) through (h).

Second Embodiment

The second embodiment is a modification of the first embodiment. In the second embodiment, $j_C = j_R = 3$ was set. FIG. 5A schematically illustrates the placement state of the first light-emitting device units 50A and second light-emitting device units 50B in each of the four planar light source units 42. In the second embodiment, the value of $j_{C \times jR}$ is an odd number "9", and accordingly a light-emitting device unit exists on the rotational symmetry axis as shown in FIGS. 5A and 5B. The light-emitting device unit on the rotational symmetry axis may be a light-emitting device unit 50A or may be a light-emitting device unit 50B. Also, for the array of the red light-emitting devices $51R_1$ and $51R_2$, green light-emitting devices $51G_1$ and $51G_2$, and blue light-emitting devices $51B_1$ and $51B_2$, in the light-emitting device units according to the second embodiment, a suitable one should be selected from the arrays shown in (A) through (P) in FIG. 2, in accordance with the above-described rules (A) through (G) or rules (a) through (h).

Third Embodiment

The third embodiment also is a modification of the first embodiment. In the third embodiment, $j_C = 3$, $j_R = 2$ was set. FIG. 5B schematically illustrates the placement state of the first light-emitting device units 50A and second light-emitting device units 50B in each of the six planar light source units 42. In the third embodiment, the value of one of $j_C$ and $j_R$ is 3 or greater, and further $j_C \neq j_R$ holds, so the first light-emitting device units 50A and the second light-emitting device units 50B are placed alternately and in twofold rotational symmetry. Also, for the array of the red light-emitting devices $51R_1$ and $51R_2$, green light-emitting devices $51G_1$ and $51G_2$, and blue light-emitting devices $51B_1$ and $51B_2$, in the light-emitting device units according to the third embodiment, a suitable one should be selected from the arrays shown in (A) through (P) in FIG. 2, in accordance with the above-described rules (A) through (G) or rules (a) through (h).

Fourth Embodiment

The fourth embodiment also is a modification of the first embodiment. In the fourth embodiment, $j_C = j_R = 4$ was set. FIG. 6A schematically illustrates the placement state of the first light-emitting device units 50A and second light-emitting device units 50B in each of the four planar light source units 42. For the array of the red light-emitting devices $51R_1$ and $51R_2$, green light-emitting devices $51G_1$ and $51G_2$, and blue light-emitting devices $51B_1$ and $51B_2$, in the light-emitting device units according to the fourth embodiment, a suitable one should be selected from the arrays shown in (A) through (P) in FIG. 2, in accordance with the above-described rules (A) through (G) or rules (a) through (h).

The following is a description of a liquid crystal display device assembly into which the planar light source described with the first embodiment through the fourth embodiment has been built in.

Figure 9A:
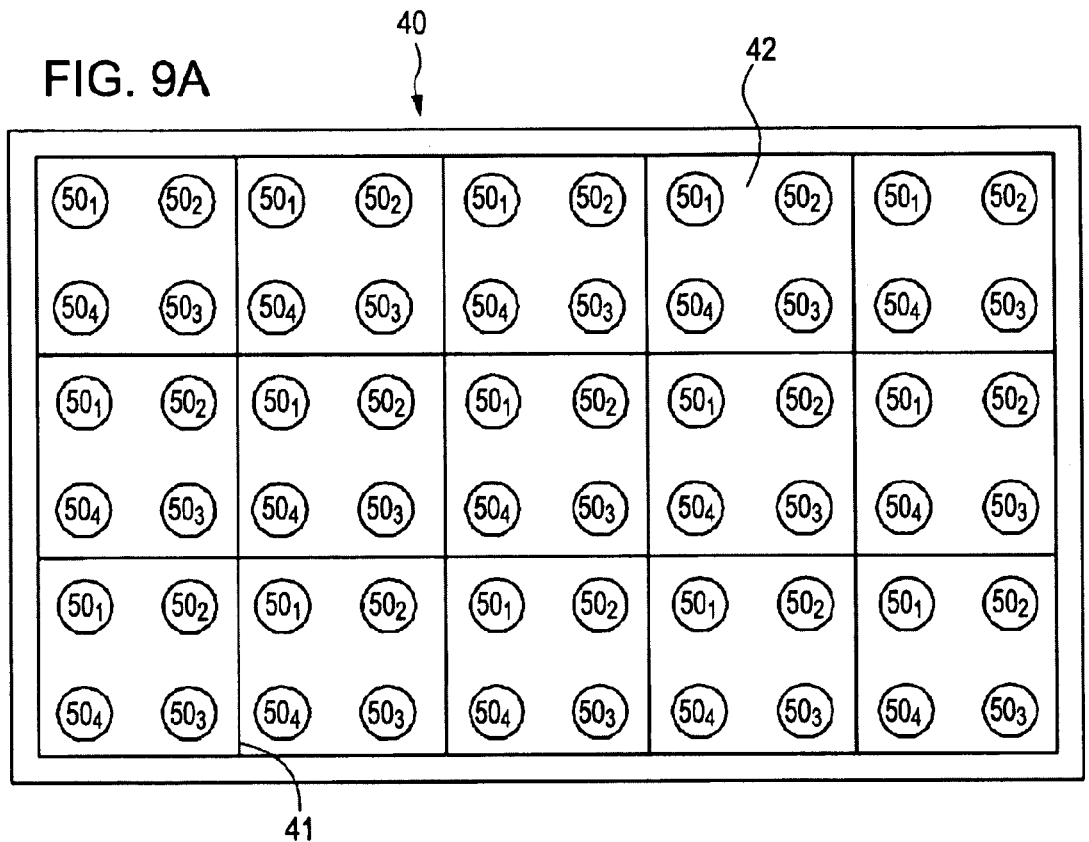
FIG. 9A is a diagram schematically illustrating the placement and array state of light-emitting devices and the like in the planar light source device according to the embodiments.
Figure 9B:
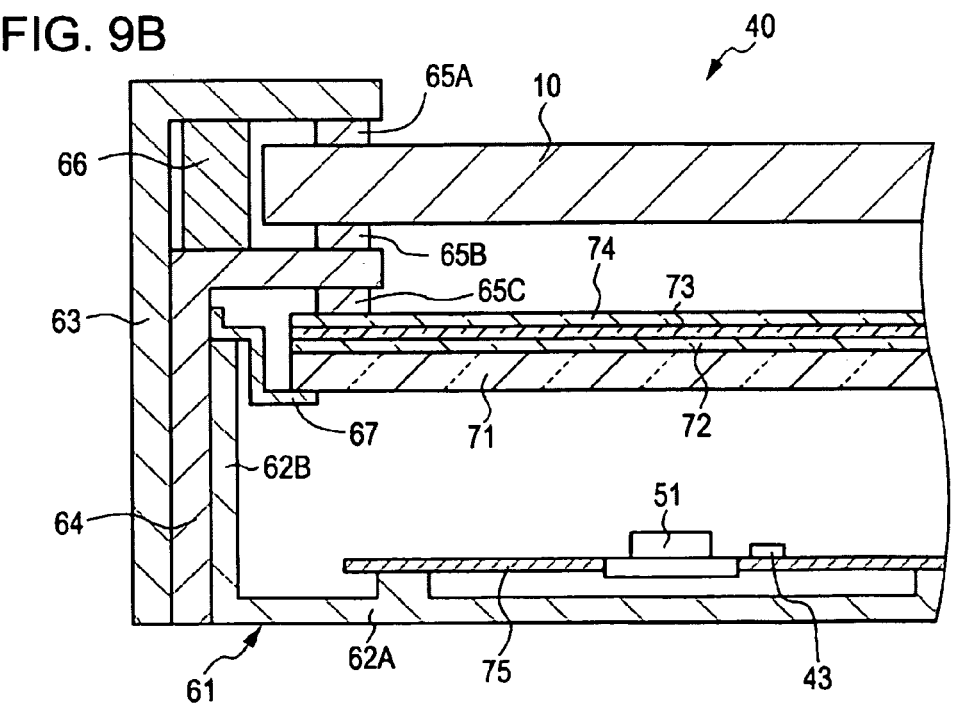
FIG. 9B is a schematic partial cross-sectional diagram of the liquid crystal display device assembly configured of the a color liquid crystal display device and planar light source device of the embodiments.

The placement and array state of the planar light source units 42 and the like in the planar light source device 40 is schematically shown in FIG. 9A, and a schematic partial cutaway view of a liquid crystal display device assembly made up of the color liquid crystal display device and planar light source device 40 is shown in FIG. 9B. Here, in FIG. 9A, the boundaries 41 between planar light source units 42 and planar light source units 42 are shown with solid lines. Note that partitions may be provided on the boundaries 41.

As can be seen from the schematic partial cutaway view of the liquid crystal display device assembly in FIG. 9B, the planar light source device 40 is configured of a casing 61 having an outer frame 63 and an inner frame 64. The end portion of the color liquid crystal display device 10 is held by the outer frame 63 and inner frame 64, being sandwiched between spacers 65A and 65B. A guide member 66 is placed between the outer frame 63 and inner frame 64, and is of a structure that the color liquid crystal display device 10 sandwiched between the outer frame 63 and inner frame 64 does not shift. At the upper portion within the casing 61, the light diffusion plate 71 is attached to the inner frame 64 via a spacer 65C and bracket member 67. An optical function sheet group of such as a diffusion sheet 72, prism sheet 73, polarization conversion sheet 74, and so forth, is layered on the light diffusion plate 71. At the lower portion within the casing 61 is provided a reflection sheet 75. Now, the reflection sheet 75 is placed such that the reflecting face thereof faces the light diffusion plate 71, and is attached to a base face 62A of the casing 61 via an unshown attaching member. The reflection sheet 75 can be configured of a silver layer reflecting film having a structure wherein white polyethylene terephthalate film (Product name MCPET, manufactured by The Furukawa Electric Co., Ltd.), silver reflecting film, low reflectivity film, and high reflectivity film are layered in order or a substrate material, for example. The reflection sheet 75 reflects light emitted form the multiple light-emitting device s51 and light reflected off of the side face 62B of the casing 61. Thus, the red light, green light, and blue light emitted from the red light-emitting devices 51R emitting red light, green light-emitting devices 51G emitting green light, and blue light-emitting devices 51B emitting blue light, are mixed, whereby a white light with high color purity can be obtained as an illumination light. This white illumination light is emitted from the planar light source units 42 via the light diffusion plate 71, passes through the optical function sheet group of such as a diffusion sheet 72, prism sheet 73, polarization conversion sheet 74, and so forth, and illuminates the color liquid crystal display device 10 from the rear face.

Photodiodes 43R, 43G, and 43B, which are photosensors, are placed near the base face 62A of the casing 61. Note that the photodiode 43R is a photodiode provided with a red filter, for measuring the light intensity of red light, the photodiode 43G is a photodiode provided with a green filter, for measuring the light intensity of green light, and the photodiode 43B is a photodiode provided with a blue filter, for measuring the light intensity of blue light. Here, one set of photosensors (photodiodes 43R, 43G, 43B) is placed for each planar light source unit 42. The luminance and chromaticity of the light-emitting devices 51R, 51G, and 51B is measured by the photodiodes 43R, 43G, and 43B, which are photosensors.

As can be seen from the schematic partial cutaway view in FIG. 10, the color liquid crystal display device 10 is configured of a front panel 20 having a transparent first electrode 24, a rear panel 30 having a transparent second electrode 34, and a liquid crystal material 13 disposed between the front panel 20 and rear panel 30.

The front panel 20 is configured of a first substrate 21 formed of a glass substrate for example, and a polarization film 26 provided on the outer face of the first substrate 21. Provided on the inner face of the first substrate 21 is a color filter 22 covered by an overcoat layer 23 formed of acrylic resin or epoxy resin, with the transparent first electrode (also called "common electrode", and is formed of ITO for example) 24 formed on the overcoat layer 23, and an orientation film 25 formed on the transparent first electrode 24. On the other hand, the rear panel 30 is more specifically configured of a second substrate 31 formed of a glass substrate for example, switching devices (specifically, thin film transistors, TFT) 32 formed on the inner face of the second substrate 31, a transparent second electrode (also called "pixel electrode", and is formed of ITO for example) 34 of which conduction/non-conduction is controlled by the switching devices 32, and a polarization film 36 provided on the outer face of the second substrate 31. An orientation film 35 is formed on the entire face including the transparent second electrode 34. The front panel 20 and rear panel 30 are joined by way of a sealant (not shown) at the periphery thereof. Note that the switching devices 32 are not restricted to TFTs, and can be configured of MIM devices, for example. Also, reference numeral 37 in the drawing denotes an insulation layer provided between the switching devices 32 and switching devices 32.

These various members and liquid crystal material making up the transmissive color liquid crystal display device may be members and materials according to the related art, and accordingly detailed description will be omitted.

Figure 7:
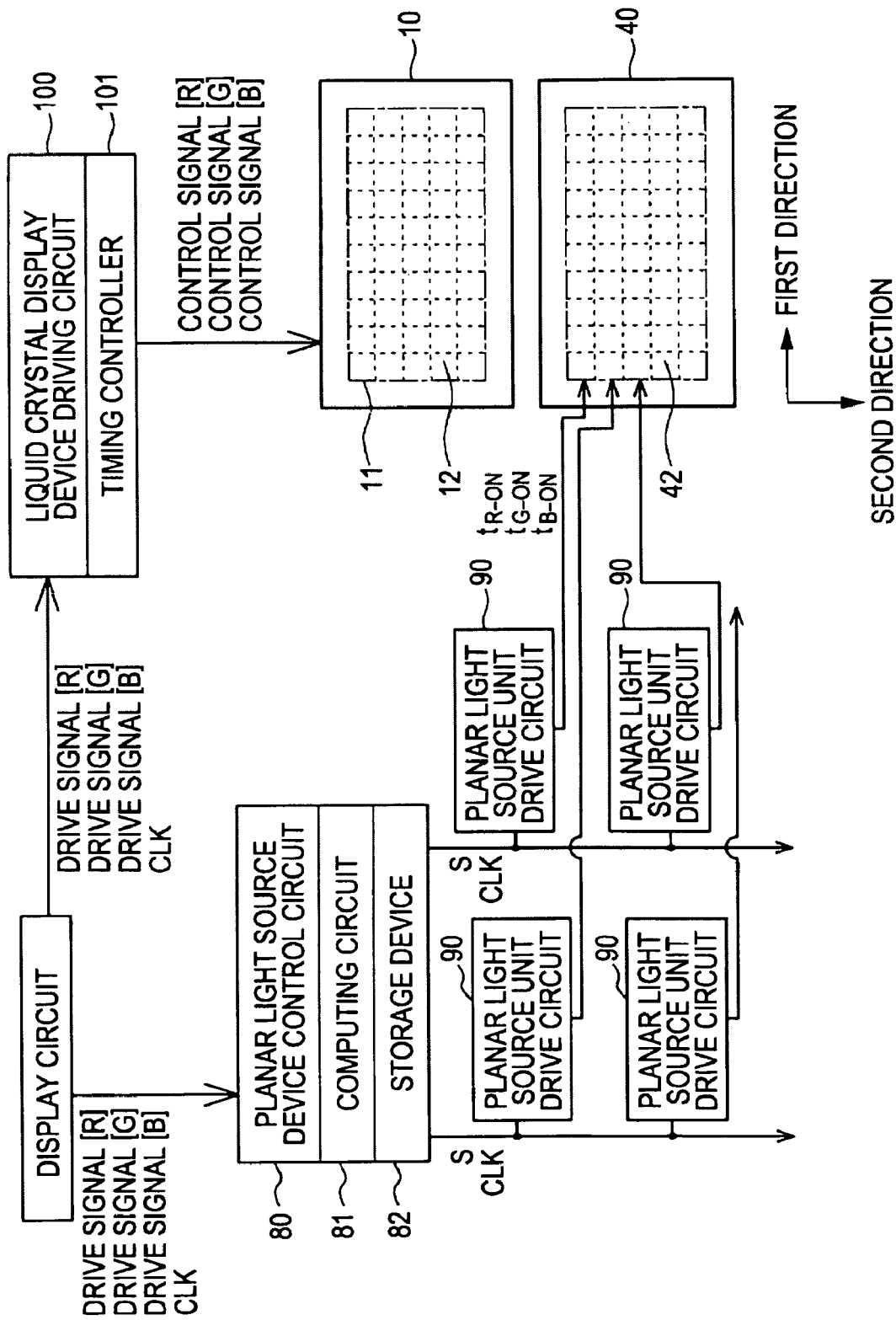
FIG. 7 is a conceptual diagram of a liquid crystal display device assembly configured of a color liquid crystal display device and planar light source device suitable for use with the embodiments.
Figure 8:
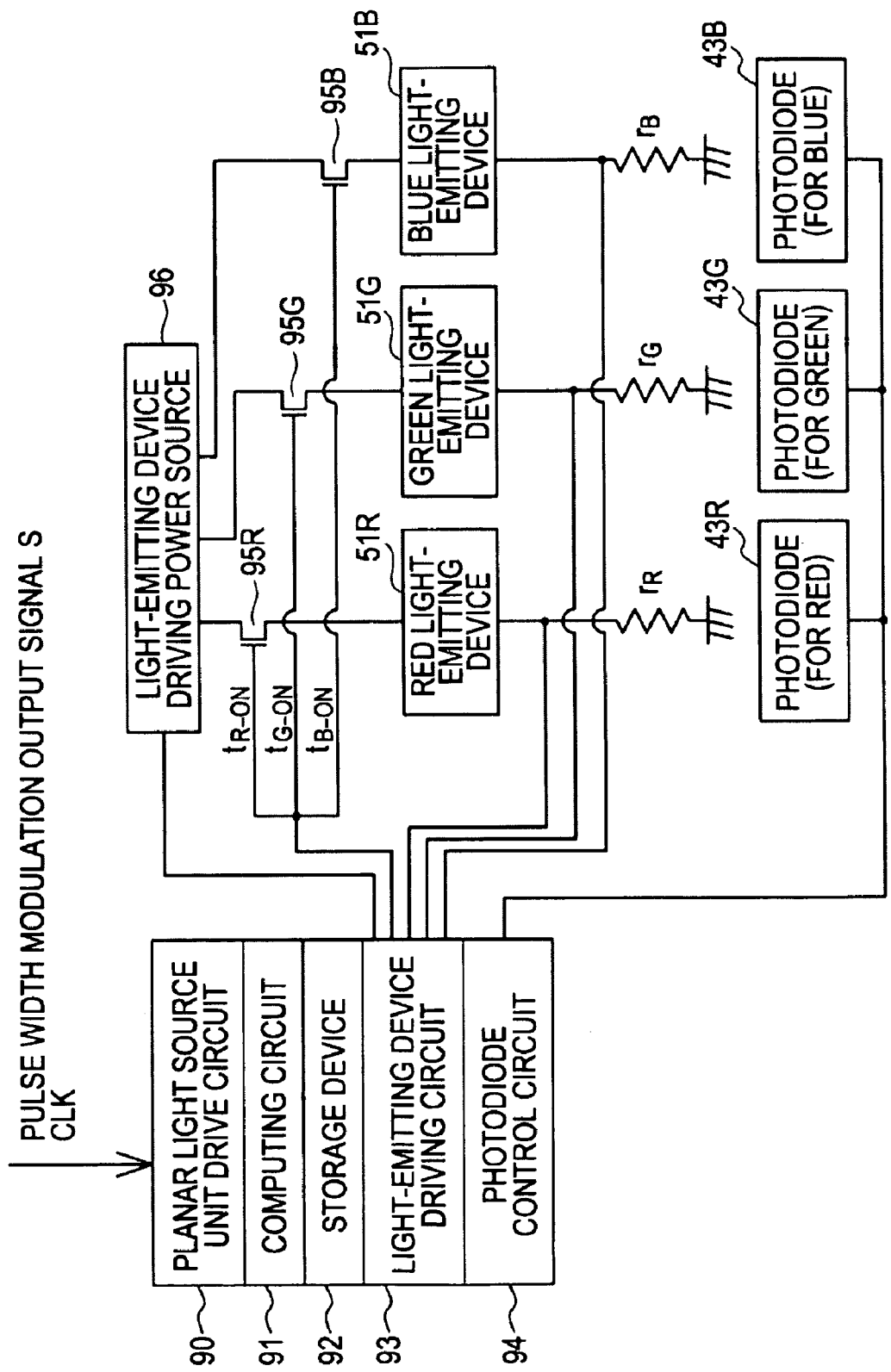
FIG. 8 is a conceptual diagram of a part of a driving circuit suitable for use with the embodiments.

As shown in FIGS. 7 and 8, the driving circuit for driving the planar light source device 40 and color liquid crystal display device 10 based on driving signals from an external display circuit is configured from a planar light source device control circuit 80 which performs on/off control of the red light-emitting devices 51R, green light-emitting devices 51G, and blue light-emitting devices 51B making up the planar light source device 40, based on pulse width modulation control, a planar light source unit driving circuit 90, and a liquid crystal display device driving circuit 100.

The planar light source device control circuit 80 is configured of a computing circuit 81 and storage device (memory) 82. On the other hand, the planar light source unit driving circuit 90 is made up of a computing circuit 91, storage device (memory) 92, light-emitting device driving circuit 93, photodiode control circuit 94, switching devices 95R, 95G, 95B formed of FETs, and a light-emitting device driving power source (constant current source) 96. Circuits and the like according to the related art can be used for the circuits and the like making up the planar light source device control circuit 80 and planar light source unit driving circuit 90. On the other hand, the liquid crystal display device driving circuit 100 for driving the color liquid crystal display device 10 is configured of circuits according to the related art such as a timing controller 101. The color liquid crystal display device 10 is provided with gate drivers, source drivers, etc. (these are not shown in the drawings), for driving the switching devices 32 made up of TFTs configuring the liquid crystal cells.

A feedback structure is formed wherein the light-emitting states of the light-emitting devices 51R, 51G, and 51B in a certain image display frame are measured by photodiodes 43R, 43G, and 43B, the outputs from the photodiodes 43R, 43G, and 43B are input to the photodiode control circuit 94, this is taken as data (signals) regarding the luminance and chromaticity of the light-emitting devices 51R, 51G, and 51B at the photodiode control circuit 94 and the computing circuit 91, the relevant data is sent to the light-emitting device driving circuit 93, and the light-emitting states of the light-emitting devices 51R, 51G, and 51B are controlled in the next image display frame.

Resistors $r_R$, $r_G$, and $r_B$, for detecting current, are disposed downstream of the light-emitting devices 51R, 51G, and 51B and serially with the light-emitting devices 51R, 51G, and 51B, with the current flowing through the resistors $r_R$, $r_G$, and $r_B$ being converted into voltage, and the operation of the light-emitting device driving power source 96 is controlled under control of the light-emitting device driving circuit 93 such that the voltage drops of the resistors $r_R$, $r_G$, and $r_B$ are predetermined values. Note that while FIG. 8 shows one light-emitting device driving power source (constant current source) 96, actually, there are light-emitting device driving power sources 96 provided for driving each of the light-emitting devices 51R, 51G, and 51B. In a single planar light source unit 42, 4i red light-emitting devices 51R ($51R_1$, $51R_2$) are serially connected, 8i green light-emitting devices 51G ($51G_1$, $51G_2$) are serially connected, and 4i blue light-emitting devices 51B ($51B_1$, $51B_2$) are serially connected.

The display region 11 configured of pixels arrayed in two-dimensional matrix fashion, are divided into P×Q display region units, which can be said to be divided into Q rows×P columns of display region units, when expressed in terms of "rows" and "columns". Also, the display region unit 12 is configured of multiple (M×N) pixels, which, when expressed in terms of "rows" and "columns", can be said to be configured of N rows×M columns of pixels. Further, there are cases wherein the red light-emitting sub-pixels (sub-pixel [R]), green light-emitting sub-pixels (sub-pixel [G]), and blue light-emitting sub-pixels (sub-pixel [B]), are collectively referred to together as "sub-pixels [R, G, B]", and there are cases wherein red light-emitting sub-pixel control signals, green light-emitting sub-pixel control signals, and blue light-emitting sub-pixel control signals, input to the sub-pixels [R, G, B] for control of the operations of the sub-pixels [R, G, B] (specifically, control of light transmissivity (aperture ratio)), are collectively referred to together as "control signals [R, G, B]", and there are cases wherein red light-emitting sub-pixel driving signals, green light-emitting sub-pixel driving signals, and blue light-emitting sub-pixel driving signals, input externally to the driving circuit for driving the sub-pixels [R, G, B] making up the display region unit are collectively referred to together as "driving signals [R, G, B]".

As described above, each pixel is configured as a set of three types of sub-pixels of a red light-emitting sub-pixel (red light-emitting sub-pixel [R]), green light-emitting sub-pixel (green light-emitting sub-pixel [G]), and blue light-emitting sub-pixel (blue light-emitting sub-pixel [B]). In the following description of embodiments, the luminance control (gradient control) of the sub-pixels [R, G, B] is 8-bit control for each, performed in $2^8$ steps of 0 through 255. Accordingly, the values $X_R$, $X_G$, and $X_B$, of the driving signals [R, G, B] input to the liquid crystal display device driving circuit 100 for driving each of the sub-pixels [R, G, B] making up each display region unit 12 each have values in $2^8$ steps. Also, the values $S_R$, $S_G$, and $S_B$, of the pulse width modulation output signals for controlling the emission time of each of the red light-emitting device 51R, green light-emitting device 51G, and blue light-emitting device 51b, making up each planar light source unit, also each have values in $2^8$ steps of 0 through 255. However, the present invention is not restricted to this, and for example 10-bit control may be used with control performed in $2^{10}$ steps of 0 through 1023, in this case the expression in 8-bit numerical values can be multiplied by four, for example.

Control signals for controlling the light transmissivity Lt of each of the sub-pixels are input to each of the sub-pixels from the driving circuit. Specifically, control signals [R, G, B] for controlling the light transmissivity Lt of each of the sub-pixels [R, G, B] are input to each of the sub-pixels [R, G, B] from the liquid crystal display device driving circuit 100. That is to say, at the liquid crystal display device driving circuit 100, control signals [R, G, B] are generated from the input driving signals [R, G, B], and the control signals [R, G, B] are supplied (output) to the sub-pixels [R, G, B]. Note that the light source luminance $Y_2$ which is the luminance of the planar light source unit 42 is changed for each image display frame, so the control signals [R, G, B] have values $X_{R\text{-}corr}$, $X_{G\text{-}corr}$, $X_{B\text{-}corr}$ obtained by performing correction (compensation) based on change in the light source luminance $Y_2$, on the driving signals [R, G, B] values $X_R$, $X_G$, and $X_B$, to the 2.2'nd power. The control signals [R, G, B] are sent out from the timing controller 101 making up the liquid crystal display device driving circuit 100 to the gate driver and source driver of the color liquid crystal display device 10 by a method according to the related art, the switching devices 32 making up each sub-pixel are driven based on the control signals [R, G, B], and desired voltage is applied to the transparent first electrode 24 and transparent second electrode 34 making up the liquid crystal cells, hereby controlling the light transmissivity (aperture ratio) Lt of each sub-pixel. Now, the greater the values $X_{R\text{-}corr}$, $X_{G\text{-}corr}$, $X_{B\text{-}corr}$ of the control signals [R, G, B] are, the higher the light transmissivity (aperture ratio) Lt of the sub-pixels [R, G, B] is, and the higher the luminance (display luminance y) of the portion of the display region corresponding to the sub-pixels [R, G, B] is. That is to say, the image (normally a point of a sort) formed by light passing through the sub-pixels [R, G, B] is bright.

Control of the display luminance y and the light source luminance $Y_2$ is performed for each image display frame, each display region unit, and each planar light source unit, of the image display on the color liquid crystal display device 10. Also, the operations of the color liquid crystal display device 10 and the planar light source device 40 within one image display frame are synchronized. Note that the number of image information sent in one second to the diving circuit as electric signals (images per second) is the frame frequency (frame rate), and the inverse of the frame frequency is the frame time (unit: seconds).

Figure 11:
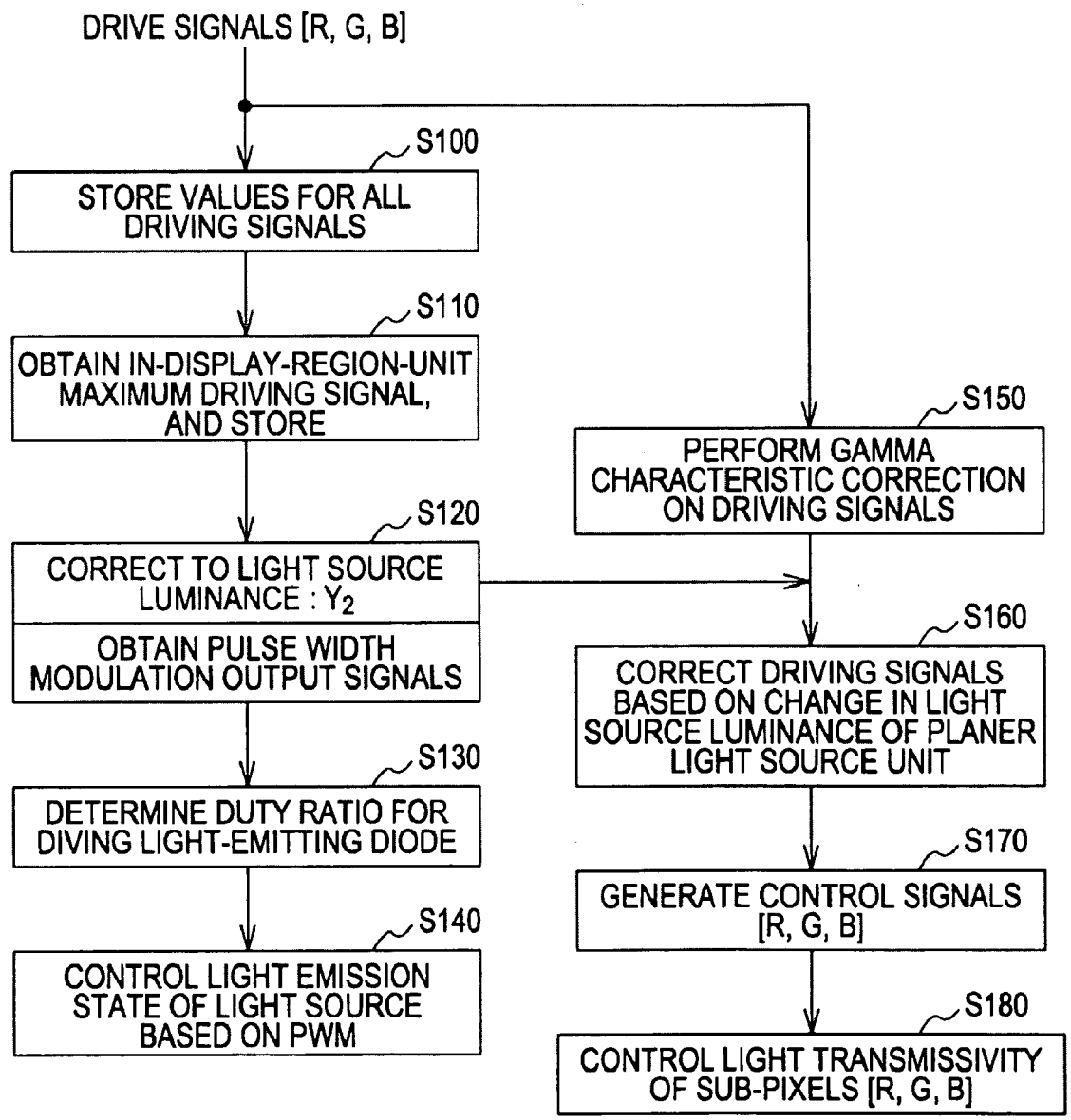
FIG. 11 is a flowchart for describing the driving method of the liquid crystal display device assembly according to the embodiments.

The following is a description of the driving method of the liquid crystal display device assembly according to the present embodiment (driving method of planar light source device with division driving), with reference to FIGS. 7, 8, and 11.

FIG. 11 is a flowchart for describing the driving method of the planar light source device with the division driving method. Note that in FIG. 11, the left side of the flowchart (steps S100 through S140) is a flow leading to control of the emission state of the light source, and the right side (steps S150 through S180) is a flow leading to aperture ratio control of the sub-pixels.

Now, control signals for controlling the light transmissivity Lt of each of the sub-pixels are supplied to each of the sub-pixels from the driving circuit. More specifically, control signals [R, G, B] for controlling the light transmissivity Lt of each of the sub-pixels [R, G, B] are input to each of the sub-pixels [R, G, B] making up each pixel from the liquid crystal display device driving circuit 100. At each planar light source unit 42, the planar light source device control circuit 80 and planar light source unit driving circuit 90 then control the luminance of the light source making of the planar light source unit 42 corresponding to a display region unit 12, such that a luminance of the pixels (sub-pixels [R, G, B]), assuming that the sub-pixels are supplied with control signals corresponding to driving signals having values equal to the in-display-region unit—driving signal maximum value $x_{U\text{-}max}$ of the driving signals [R, G, B] values $X_R$, $X_G$, and $X_B$ input to the driving circuits 80, 90, 100 for driving all pixels (sub-pixels [R, G, B]) making up each display region unit 12 (the display luminance—second stipulated value $y_2$ in the light transmissivity—first stipulated value $Lt_1$) is obtained. More specifically, for example, the light source luminance $Y_2$ can be controlled (e.g., reduced) such that the display luminance $y_2$ is obtained when the light transmissivity (aperture ratio) of the sub-pixels is set to the first stipulated value $Lt_1$. That is to say, for example, the light source luminance $Y_2$ of the planar light source unit 42 in each image display frame can be controlled such that the following Expression (1) is satisfied. Note that the relation of $Y_2 \leq Y_1$ holds.

$$Y_2 \cdot Lt_1 = Y_1 \cdot Lt_2 \qquad (1)$$

In step S100, one image display frame worth of driving signals [R, G, B] and clock signal CLK sent from a display circuit according to the related art such as a scan converter or so forth are input to the planar light source device control circuit 80 and the liquid crystal display device driving circuit 100 (see FIG. 7). Note that the driving signals [R, G, B] are output signals from an imaging tube with the input light quantity to the imaging tube as y' for example, and are diving signals output from, for example, a broadcasting station or the like and also input to the liquid crystal display device driving circuit 100 for controlling the light transmissivity Lt of the sub-pixels, and can be expressed by a function of the input light quantity y' to the 0.45'th power. The values $X_R$, $X_G$, and $X_B$ of the driving signals [R, G, B] of one image display frame worth input to the planar light source device control circuit 80 are temporarily stored in the storage device (memory) 82 configuring the planar light source device control circuit 80. Also, the values $X_R$, $X_G$, and $X_B$ of the driving signals [R, G, B] of one image display frame worth input to the liquid crystal display device driving circuit 100 are also temporarily stored in a storage device (not shown) configuring the liquid crystal display device driving circuit 100.

Next, in step S110, with the computing circuit 81 making up the planar light source device control circuit 80, the values of the driving signals [R, G, B] stored in the storage device 82 are read out, and at the (p, q)'th (wherein p=1, q=1, first) display region unit 12, the in-display-region unit—driving signal maximum value $x_{U\text{-}max}$ which is the maximum value within the values $X_R$, $X_G$, and $X_B$ of the driving signals [R, G, B] for driving the sub-pixels [R, G, B] out of all pixels making up this (p, q)'th display region unit 12, is obtained at the computing circuit 81. Next, the in-display-region unit—driving signal maximum value $x_{U\ max}$ is stored in the storage device 82. This step is executed to all of m=1, 2, ..., M, n=1, 2, ..., N, i.e., for M×N pixels.

For example, in the event that $X_R$ is a value equivalent to "110", $X_G$ is a value equivalent to "150", and $X_B$ is a value equivalent to "50", $x_{U-max}$ is a value equivalent to "150".

This operation is repeated from (p, q)=(1, 1) to (P, Q), and the in-display-region unit—driving signal maximum value $x_{U-max}$ is stored in the storage device 82 for all display region units 12.

Figure 13A:
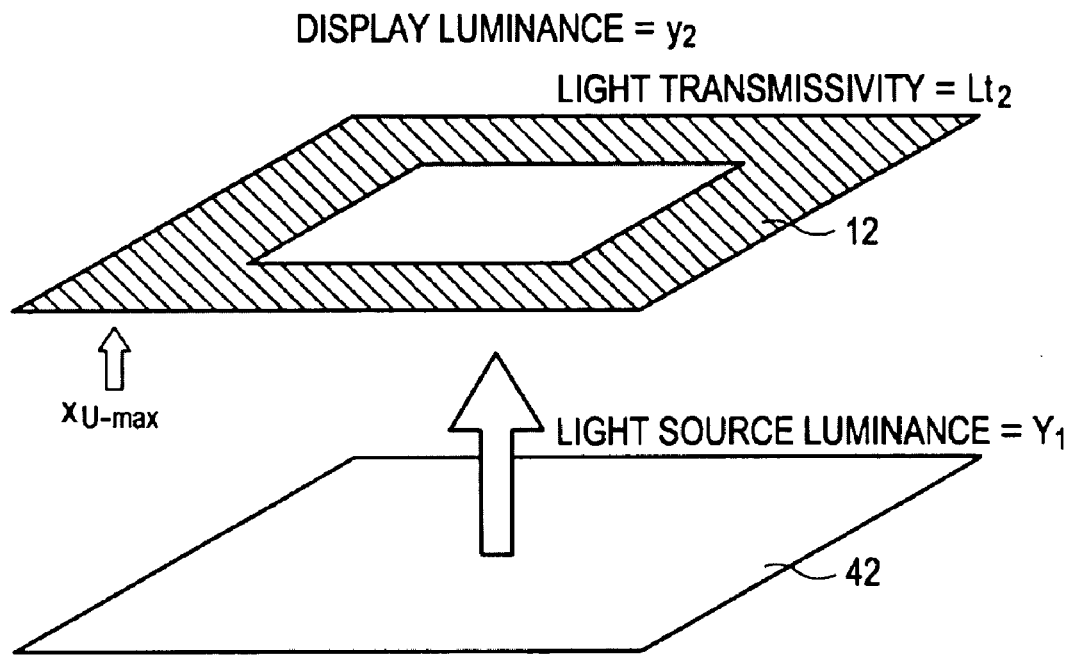
FIG. 13A and FIG. 13B are conceptual diagrams for describing a state of increasing/decreasing the light source luminance $Y_2$ of the planar light source unit under control of the planar light source unit driving circuit, such that the display luminance—second stipulated value $y_2$ is obtained at the planar light source unit, assuming that control signals corresponding to driving signals having values equal to the in-display-region unit—driving signal maximum value $x_{U-max}$ are supplied to the pixels.
Figure 13B:
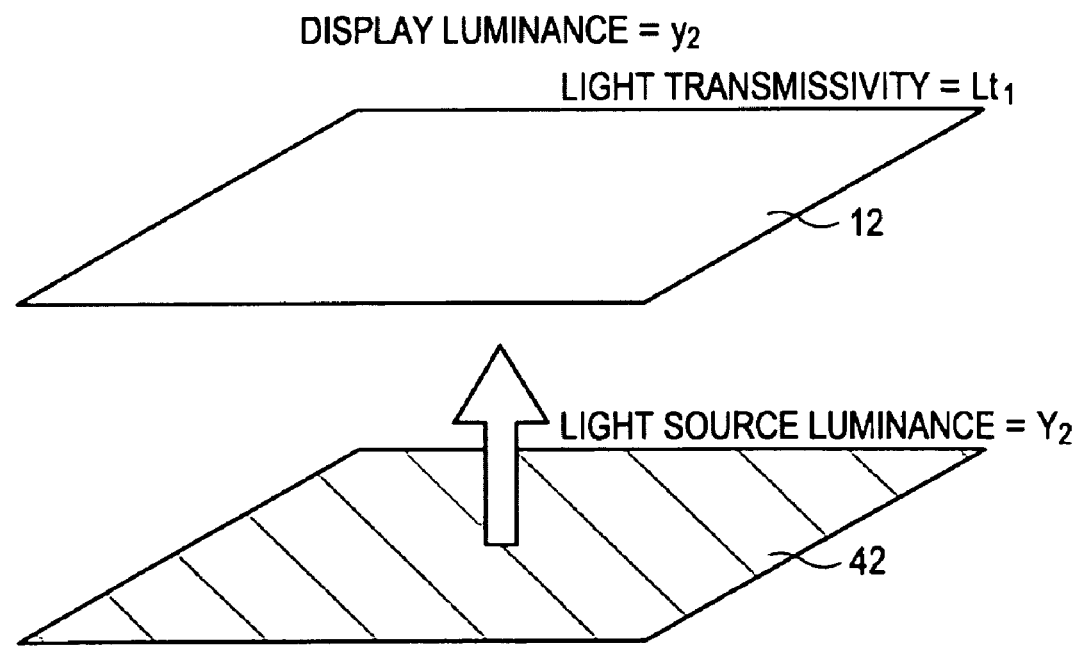

Next, in step S120, the light source luminance $Y_2$ of the planar light source unit 42 corresponding to the display region unit 12 is increased or decreased under control of the planar light source unit driving circuit 90, such that the luminance assuming that the sub-pixels [R, G, B] are supplied with control signals [R, G, B] corresponding to driving signals [R, G, B] having values equal to the in-display-region unit—driving signal maximum value $x_{U-max}$ (the display luminance—second stipulated value $y_2$ in the light transmissivity—first stipulated value $Lt_1$) is obtained at the planar light source unit 42. Specifically, the light source luminance $Y_2$ can be controlled for each image display frame and each planar light source unit so as to satisfy the following Expression (2). More specifically, the luminance of light-emitting devices 51 can be controlled based on Expression (3) which is a light source luminance control function $g(X_{nol-max})$, and also the light source luminance $Y_2$ can be controlled so as to satisfy Expression (2). Conceptual drawings of such control are shown in FIGS. 13A and 13B. Note however, that correction based on the effects of other planar light source units 42 is preferably performed on the light source luminance $Y_2$ as appropriate, as described later. Note that these relations relating to control of the light source luminance $Y_2$, i.e., the relation of luminance control parameters for the planar light source unit 42, such that the in-display-region unit—driving signal maximum value $x_{U-max}$, the value of control signals corresponding to driving signals having a value equal to this maximum value $x_{U-max}$, the display luminance—second stipulated value $y_2$ when assuming that such control signals are supplied to the sub-pixels, the light transmissivity (aperture ratio) (display luminance—second stipulated value $y_2$) of each sub-pixel at this time, and the display luminance—second stipulated value $y_2$ with the light transmissivity—first stipulated value $Lt_1$ as the light transmissivity (aperture ratio) of each sub-pixel, can be obtained, can be stored in the storage device 82 or the like.

$$Y_2 \cdot Lt_1 = Y_1 \cdot Lt_2 \quad (2)$$

$$g(x_{nol-max}) = a_1 \cdot (x_{nol-max})^{2.2} + a_0 \quad (3)$$

Now, with the maximum value of the driving signals input to the liquid crystal display device driving circuit 100 for driving each of the sub-pixels [R, G, B] making up the pixels (driving signals [R, G, B]) as $x_{max}$, $$x_{nol-max} = x_{U-max}/x_{max}$$

holds, where $a_1$, $a_0$ are constants, and can be expressed by $$a_1 + a_0 = 1$$

$$0 < a_0 < 1, \; 0 < a_1 < 1.$$

For example, $$a_1 = 0.99$$

$$a_0 = 0.01$$

is suitable. Also, the values of each of $X_R$, $X_G$, and $X_B$ of the driving signals [R, G, B] have values in $2^8$ steps, so the value of $x_{max}$ is a value equivalent to "255".

Now, with the planar light source device 40, in the event of assuming luminance control of a planar light source unit 42 (p, q)=(1, 1) for example, there are cases where the effects of the other P×Q planar light source units 42 should be taken into consideration. The effects which such a planar light source unit 42 will receive from other planar light source units 42 has been determined beforehand from the emission profile of the planar light source units 42, so the difference can be calculated by calculating back, and consequently, correction can be realized. The basic form of calculation is described below.

The luminance (light source luminance $Y_2$) demanded of the P×Q planar light source units 42 based on Expression (2) and Expression (3) will be expressed as a matrix $[L_{P\times Q}]$. Also, the luminance of a certain planar light source unit obtained in the event that a certain planar light source unit alone is driven and the other planar light source units are not being driven is obtained for the P×Q planar light source units 42 beforehand. This luminance will be expressed as a matrix $[L'_{P\times Q}]$. Further, correction coefficients will be expressed as a matrix $[\alpha_{P\times Q}]$. The relation between the matrices can be expressed as in the following Expression (4-1). The correction coefficient matrix $[\alpha_{P\times Q}]$ can be obtained beforehand.

$$[L_{P\times Q}] = [L'_{P\times Q}] \cdot [(\alpha_{P\times Q}] \quad (4\text{-}1)$$

Accordingly, the matrix $[L'_{P\times Q}]$ can be obtained by Expression (4-1). The matrix $[L'_{P\times Q}]$ can be obtained by inverse matrix computation. That is to say, $$[L'_{P\times Q}] = [L_{P\times Q}] \cdot [\alpha_{P\times Q}]^{-1} \quad (4\text{-}2)$$

can be calculated to this end. The light source (light-emitting devices 51) provided to each planar light source unit 42 can be controlled so as to obtain the luminance represented with the matrix $[L'_{P\times Q}]$, specifically the relevant operations and processing can be performed using the information (data table) stored in the storage device (memory) 82. Note that in controlling the light-emitting devices 51, it goes without saying that the value of the matrix $[L'_{P\times Q}]$ will not assume a negative value, so the computation results should be kept in the positive region. Accordingly, the solution to Expression (3-2) may be an approximate solution rather than an exact solution.

Thus, the matrix $[L'_{P\times Q}]$ of luminance assuming driving the planar light source unit individually can be obtained as described above based on the $[L_{P\times Q}]$ obtained from the Expression (2) and Expression (3) obtained at the computing circuit 81 making up the planar light source device control circuit 80, and the correction coefficient matrix $[\alpha_{P\times Q}]$, and further, this is converted into a corresponding integer within the range of 0 to 255 (value of pulse width modulation output signal) based on the conversion table stored in the storage device 82. Thus, the pulse width modulation output signal value $S_R$ for controlling the emission time of the red light-emitting devices 51R, the pulse width modulation output signal value $S_G$ for controlling the emission time of the green light-emitting devices 51G, and the pulse width modulation output signal value $S_B$ for controlling the emission time of the blue light-emitting devices 51B, at the planar light source unit 42, can be obtained at the computing circuit 81 making up the planar light source device control circuit 80.

Next, in step S130, the pulse width modulation output signal values $S_R$, $S_G$, and $S_B$, obtained at the computing circuit 81 making up the planar light source device control circuit 80, are sent out to the storage device 92 of the planar light source unit driving circuit 90 provided corresponding to the planar light source unit 42, and stored in the storage device 92. Also, the clock signal CLK is also sent out to the planar light source unit driving circuit 90 (see FIG. 8).

In step S140, the computing circuit 91 determines the on-time $t_{R\text{-}ON}$ and off-time $t_{R\text{-}OFF}$ of the red light-emitting devices 51R, the on-time $t_{G\text{-}ON}$ and off-time $t_{G\text{-}OFF}$ of the green light-emitting devices 51G, and the on-time $t_{B\text{-}ON}$ and off-time $t_{B\text{-}OFF}$ of the blue light-emitting devices 51B, making up the planar light source unit 42, based on the pulse width modulation output signal values $S_R$, $S_G$, and $S_B$. Note that $$T_{R\text{-}ON}+t_{R\text{-}OFF}=t_{G\text{-}ON}+t_{G\text{-}OFF}=t_{B\text{-}ON}+t_{B\text{-}OFF}=\text{constant value } t_{Const}$$

holds. Also, the duty ratio in driving based on pulse width modulation of light-emitting devices can be expressed as $$t_{ON}/(t_{ON}+t_{OFF})=t_{ON}/t_{Const}.$$

Signals equivalent to the on-times $t_{R\text{-}ON}$, $t_{G\text{-}ON}$, $t_{B\text{-}ON}$, of the red light-emitting devices 51R, green light-emitting devices 51G, and blue light-emitting devices 51B, making up the planar light source unit 42, are sent to the light-emitting device driving circuit 93, switching devices 95R, 95G, 95B are in an on state for on-times of $t_{R\text{-}ON}$, $t_{G\text{-}ON}$, $t_{B\text{-}ON}$, based on values of signals equivalent to the on-times of $t_{R\text{-}ON}$, $t_{G\text{-}ON}$, $t_{B\text{-}ON}$, from the light-emitting device driving circuit 93, and LED driving current is applied from the light-emitting device driving power sources 96 to the respective light-emitting devices 51R, 51G, and 51B. As a result, the light-emitting devices 51R, 51G, and 51B emit light for the on-times of $t_{R\text{-}ON}$, $t_{G\text{-}ON}$, and $t_{B\text{-}ON}$, in one image display frame. Thus, each display region unit 12 is illuminated with a predetermined luminance.

Figure 12A:
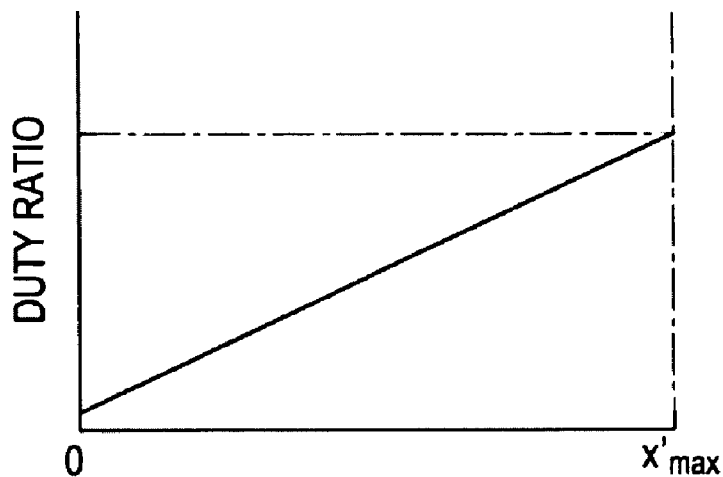
FIG. 12A is a diagram schematically illustrating the relation between a value ($x' \equiv x^{2.2}$) obtained as the driving signal input to the liquid crystal display device driving circuit for driving sub-pixels to the 2.2'nd power, and the duty ratio ($= t_{ON}/t_{Const}$)
Figure 12B:
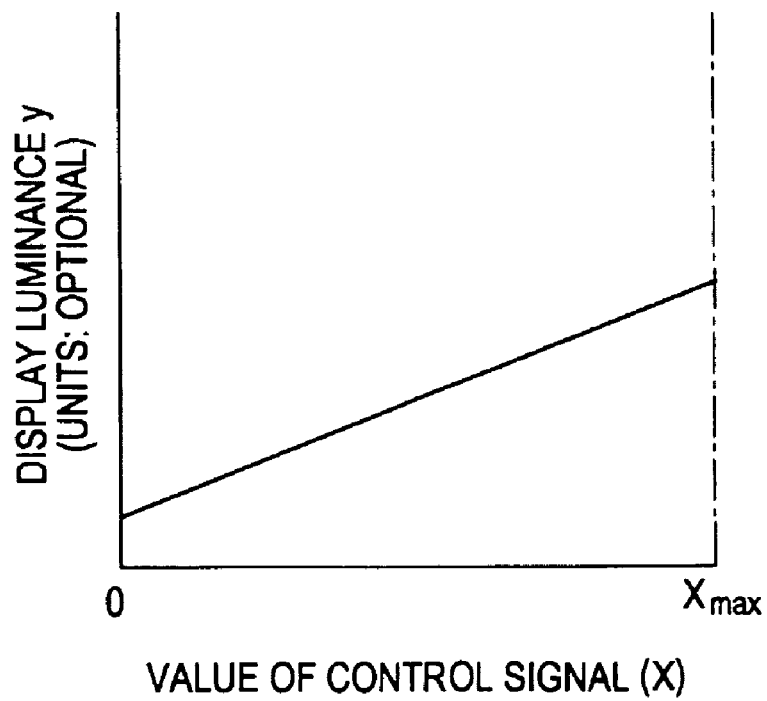
FIG. 12B is a diagram schematically illustrating the relation between the value X of control signals for controlling the light transmissivity Lt of the sub-pixels, and the display luminance y.

The state obtained in this way is shown in solid lines in FIGS. 12A and 12B, where FIG. 12A is a diagram schematically illustrating the relation between a value $(x'\equiv x^{2.2})$ obtained as the driving signal input to the liquid crystal display device driving circuit 100 for driving sub-pixels to the 2.2'nd power, and the duty ratio ($=t_{ON}/t_{Const}$), and FIG. 12B is a diagram schematically illustrating the relation between the value X of control signals for controlling the light transmissivity Lt of the sub-pixels, and the display luminance y.

On the other hand, in step S150, the same values $x_R$, $x_G$, and $x_B$ of the driving signals [R, G, B] as those input to the liquid crystal display device driving circuit 100 are subjected to gamma characteristic correction, and then sent to the timing controller 101.

Now, the light source luminance $Y_2$ of the light-emitting device unit 42 is changed each image display frame, so in step S160, the driving signal [R, G, B] value to the 2.2'nd power is subjected to correction (compensation) based on change in the light source luminance $Y_2$.

In step S170, the timing controller 101 generates control signals [R, G, B] according to the input driving signals [R, G, B], which are then supplied (output) to the sub-pixels [R, G, B] in step S180.

The values $X_R$, $X_G$, and $X_B$ of the control signals [R, G, B] generated at the timing controller 101 of the liquid crystal display device driving circuit 100 supplied from the liquid crystal display device driving circuit 100 to the sub-pixels [R, G, B] and the values $x_R$, $x_G$, and $x_B$ of the driving signals [R, G, B] are in the relation of the following Expression (5-1), Expression (5-2), and Expression (5-3 ), where $b_{1\_R}$, $b_{0\_R}$, $b_{1\_G}$, $b_{0\_G}$, $b_{1\_B}$, and $b_{0\_B}$ are constants.

That is to say, with the present embodiment, the light source luminance $Y_2$ changes with each image display frame, so the light transmissivity (aperture ratio) Lt of the sub-pixels is controlled by determining and correcting (compensating) the values $X_R$, $X_G$, and $X_B$ of the control signals [R, G, B] such that the display luminance—second stipulated value $y_2$ is obtained with the light source luminance $Y_2$ ($\geq Y_1$). Note that here, the functions $f_R$, $f_G$, and $f_B$ in the Expression (5-1), Expression (5-2), and Expression (5-3) are functions obtained beforehand for performing the relevant correction (compensation).

$$X_R=f_R(b_{1\_R}\cdot x_R^{2.2}+b_{0\_R}) \tag{5-1}$$

$$X_G=f_G(b_{1\_G}\cdot x_G^{2.2}+b_{0\_G}) \tag{5-2}$$

$$X_B=f_B(b_{1\_B}\cdot x_B^{2.2}+b_{0\_B}) \tag{5-3}$$

Thus, the image display operations for one image display frame are completed.

While the present invention has been described by way of preferred embodiments, the present invention is not restricted to these embodiments. The liquid crystal display device, planar light source device, light-emitting device unit, liquid crystal display device assembly, and driving circuits described with the embodiments are exemplary in configuration and structure, and members and materials and the like configuring these are also exemplary and can be modified as suitable.

In the embodiments, the light-emitting device units of the planar light source units have been described of being formed only of first light-emitting device units and second light-emitting device units, but the present invention is not restricted to this. For example, the placement state of light-emitting device units in a modification of the planar light source unit according to the second embodiment is shown in FIG. 6B as each planar light source being configured from first light-emitting device units 50A, second light-emitting device units 50B, and third light-emitting device units 50C. Note that in this example, each of the light-emitting device units at the four corners in the array of the 3×3=9 light-emitting device units are placed at the four corners of the planar light source units, with the first light-emitting device units 50A, second light-emitting device units 50B, and third light-emitting device units 50C being placed in twofold rotational symmetry. However, the conditions for the planar light source device and the like according to the second mode are not satisfied.

Also, an arrangement may be made wherein the temperature of the light-emitting devices is monitored with a temperature sensor, with the results being fed back to the planar light source unit driving circuit so as to perform luminance compensation (correction) of the planar light source units and temperature control. While description has been made in the embodiments assuming that the display region of the liquid crystal display device is divided into P×Q hypothetical display region units, but in some cases, the transmissive liquid crystal display device may have a structure of having been divided into P×Q actual display region units. While description has been made in the embodiments that a partial driving method (division driving method) is used as the driving method of the planar light source device, the present invention is not restricted to this, and a method may be used wherein multiple planar light source units or multiple light sources are driven simultaneously under the same driving conditions, or a method may be used wherein these are driven simultaneously under the different driving conditions in a stationary manner (for example, at the time of manufacturing of the liquid crystal display device assembly, property evaluation testing is performed for each planar light source unit, the driving conditions of each planar light source unit are determined so that a constant and uniform luminance is obtained for the entire planar light source device, and the planar light source device is driven in a stationary manner based on these driving conditions at the time of normal display operations of the liquid crystal display device assembly).

It should be understood by those skilled in the art that various modifications, combinations, sub-combinations and alterations may occur depending on design requirements and other factors insofar as they are within the scope of the appended claims or the equivalents thereof.

What is claimed is:

1. A planar light source device configured to illuminate a transmissive liquid crystal device having a display region configured of pixels arrayed in a two-dimensional matrix from the rear side, said planar light source device comprising:

P×Q planar light source units corresponding to P×Q display region units assuming the display region of said liquid crystal display device is divided into P×Q hypothetical display region units;

wherein a light source provided to each planar light source unit has $j_C \times j_R$ (where $j_C$ and $j_R$ are integers of 2 or greater) light-emitting device units;

and wherein the light-emitting device units in each planar light source unit are classified into at least a first light-emitting device unit and a second light-emitting device unit;

and wherein each light-emitting device unit is configured of i (where i is an integer of 1 or greater) red light-emitting devices which emit red light, 2i green light-emitting devices which emit green light, and i blue light-emitting devices which emit blue light;

and wherein, at each planar light source unit;

(A) red light-emitting devices are classified into red light-emitting devices having a first luminance value, and red light-emitting devices having a second luminance value lower than that of the first luminance value, (B) green light-emitting devices are classified into green light-emitting devices having a first luminance value, and green light-emitting devices having a second luminance value lower than that of the first luminance value, (C) blue light-emitting devices are classified into blue light-emitting devices having a first luminance value, and blue light-emitting devices having a second luminance value lower than that of the first luminance value, (D) the classification category of the luminance value of the red light-emitting devices making up the first light-emitting device unit differs from the classification category of the luminance value of the red light-emitting devices making up the second light-emitting device unit, (E) the 2i green light-emitting devices making up each green light-emitting device unit are configured of green light-emitting devices having a first luminance value, and green light-emitting devices having a second luminance value that is different from the first luminance value, (F) the classification category of the luminance value of the blue light-emitting devices making up the first light-emitting device unit differs from the classification category of the luminance value of the blue light-emitting devices making up the second light-emitting device unit, and (G) said first light-emitting device unit and said second light-emitting device unit are placed in at least twofold rotational symmetry.

2. The planar light source device according to claim 1, wherein $j_C = j_R = 2$;

and wherein the planar shape of said planar light source unit is rectangular;

and wherein four light-emitting device units are each placed at the four corners of the planar light source unit;

and wherein said first light-emitting device unit and said second light-emitting device unit are placed alternately and in at least twofold rotational symmetry.

3. The planar light source device according to claim 1, wherein $j_C = j_R \geq 3$;

and wherein the planar shape of said planar light source unit is rectangular;

and wherein said first light-emitting device unit and said second light-emitting device unit are placed alternately and in at least fourfold rotational symmetry with regard to placement.

4. The planar light source device according to claim 1, wherein the light emission states of the planar light source units are controlled individually.

5. The planar light source device according to claim 1, wherein $$0.4 \leq I_{R-2}/I_{R-1} \leq 0.9$$

$$0.4 \leq I_{G-2}/I_{G-1} \leq 0.9$$

$$0.4 \leq I_{B-2}/I_{B-1} \leq 0.9$$

hold, where the first luminance value at a red light-emitting device is $I_{R-1}$ and the second luminance value is $I_{R-2}$, the first luminance value at a green light-emitting device is $I_{G-1}$ and the second luminance value is $I_{G-2}$, and the first luminance value at a blue light-emitting device is $I_{B-1}$ and the second luminance value is $I_{B-2}$.

6. The planar light source device according to claim 1, wherein the center of gravity of a luminance profile based on red light-emitting devices, the center of gravity of a luminance profile based on green light-emitting devices, and the center of gravity of a luminance profile based on blue light-emitting devices, in each planar light source unit, generally agree.

7. A planar light source device configured to illuminate a transmissive liquid crystal device having a display region configured of pixels arrayed in a two-dimensional matrix of a first direction and a second direction orthogonal to said first direction, from the rear side, said planar light source device comprising:

a total of $P \times Q \times j_C \times j_R$ (where P and Q are positive integers, and $j_C$ and $j_R$ are integers or 2 or greater) light-emitting device units of $P \times j_C$ in the first direction and $Q \times j_R$ in the second direction;

wherein each light-emitting device unit is configured of i (where i is an integer of 1 or greater) red light-emitting devices which emit red light, 2i green light-emitting devices which emit green light, and i blue light-emitting devices which emit blue light;

and wherein, with a light-emitting device unit positioned at an arbitrary position as a first light-emitting device unit, a light-emitting device unit adjacent to said first light-emitting device unit in the first direction as a second light-emitting device unit, a light-emitting device unit adjacent to said first light-emitting device unit in the second direction as a fourth light-emitting device unit, and a light-emitting device unit adjacent to said second light-emitting device unit in the second direction as a third light-emitting device unit;

(a) 4i red light-emitting devices making up said four light-emitting device units are classified into 2i red light-emitting devices having a first luminance value and 2i red light-emitting devices having a second luminance value which is lower than the first luminance value, (b) 8i green light-emitting devices making up said four light-emitting device units are classified into 4i green light-emitting devices having a first luminance value and 4i green light-emitting devices having a second luminance value which is lower than the first luminance value, (c) 4i blue light-emitting devices making up said four light-emitting device units are classified into 2i blue light-emitting devices having a first luminance value and 2i blue light-emitting devices having a second luminance value which is lower than the first luminance value, (d) the classification categories of luminance values which the red light-emitting devices making up the first light-emitting device unit and the third light-emitting device unit have belong to the same classification category, and the classification categories of luminance values which the red light-emitting devices making up the second light-emitting device unit and the fourth light-emitting device unit have belong to the same classification category, (e) the classification category of luminance values of the red light-emitting devices making up the first light-emitting device unit and the third light-emitting device unit, and the classification category of luminance values of the red light-emitting devices making up the second light-emitting device unit and the fourth light-emitting device unit, differ, (f) 2i green light-emitting devices making up each of the first, second, third, and fourth light-emitting device units are made up of green light-emitting devices having a first luminance value and green light-emitting devices having a second luminance value that is different from the first luminance value, (g) the classification categories of luminance values which the blue light-emitting devices making up the first light-emitting device unit and the third light-emitting device unit have belong to the same classification category, and the classification categories of luminance values which the blue light-emitting devices making up the second light-emitting device unit and the fourth light-emitting device unit have belong to the same classification category, and (h) the classification category of luminance values of the blue light-emitting devices making up the first light-emitting device unit and the third light-emitting device unit, and the classification category of luminance values of the blue light-emitting devices making up the second light-emitting device unit and the fourth light-emitting device unit, differ.

8. The planar light source device according to claim 7, wherein $0.4 \leq I_{R-2}/I_{R-1} \leq 0.9$ $0.4 \leq I_{G-2}/I_{G-1} \leq 0.9$ $0.4 \leq I_{B-2}/I_{B-1} \leq 0.9$ hold,
where the first luminance value at a red light-emitting device is $I_{R-1}$ and the second luminance value is $I_{R-2}$,
the first luminance value at a green light-emitting device is $I_{G-1}$ and the second luminance value is $I_{G-2}$, and
the first luminance value at a blue light-emitting device is $I_{B-1}$ and the second luminance value is $I_{B-2}$.

9. The planar light source device according to claim 7, wherein the center of gravity of a luminance profile based on red light-emitting devices, the center of gravity of a luminance profile based on green light-emitting devices, and the center of gravity of a luminance profile based on blue light-emitting devices, in the smallest increment of a planar light source unit configured of said four light-emitting device units, generally agree.

10. A liquid crystal display device assembly comprising:
(i) a transmissive liquid crystal device having a display region configured of pixels arrayed in a two-dimensional matrix; and
(ii) a planar light source device configured to illuminate the transmissive liquid crystal device from the rear side;
wherein said planar light source device is made up of P×Q planar light source units corresponding to P×Q display region units assuming the display region of said liquid crystal display device is divided into P×Q hypothetical display region units;
and wherein a light source provided to each planar light source unit has $j_C \times j_R$ (where $j_C$ and $j_R$ are integers of 2 or greater) light-emitting device units;
and wherein the light-emitting device units in each planar light source unit are classified into at least a first light-emitting device unit and a second light-emitting device unit;
and wherein each light-emitting device unit is configured of i (where i is an integer of 1 or greater) red light-emitting devices which emit red light, 2i green light-emitting devices which emit green light, and i blue light-emitting devices which emit blue light;
and wherein, at each planar light source unit;
(A) red light-emitting devices are classified into red light-emitting devices having a first luminance value, and red light-emitting devices having a second luminance value lower than that of the first luminance value,
(B) green light-emitting devices are classified into green light-emitting devices having a first luminance value, and green light-emitting devices having a second luminance value lower than that of the first luminance value,
(C) blue light-emitting devices are classified into blue light-emitting devices having a first luminance value, and blue light-emitting devices having a second luminance value lower than that of the first luminance value,
(D) the classification category of the luminance value of the red light-emitting devices making up the first light-emitting device unit differs from the classification category of the luminance value of the red light-emitting devices making up the second light-emitting device unit,
(E) the 2i green light-emitting devices making up each green light-emitting device unit are configured of green light-emitting devices having a first luminance value, and green light-emitting devices having a second luminance value that is different from the first luminance value,
(F) the classification category of the luminance value of the blue light-emitting devices making up the first light-emitting device unit differs from the classification category of the luminance value of the blue light-emitting devices making up the second light-emitting device unit, and
(G) said first light-emitting device unit and said second light-emitting device unit are placed in at least twofold rotational symmetry.

11. A liquid crystal display device assembly comprising:
(i) a transmissive liquid crystal device having a display region configured of pixels arrayed in a two-dimensional matrix of a first direction and a second direction orthogonal to said first direction; and (ii) a planar light source device configured to illuminate the transmissive liquid crystal device from the rear side;

wherein said planar light source device includes a total of $P \times Q \times j_C \times j_R$ (where P and Q are positive integers, and $j_C$ and $j_R$ are integers or 2 or greater) light-emitting device units of $P \times j_C$ in the first direction and $Q \times j_R$ in the second direction;

and wherein each light-emitting device unit is configured of i (where i is an integer of 1 or greater) red light-emitting devices which emit red light, 2i green light-emitting devices which emit green light, and i blue light-emitting devices which emit blue light;

and wherein, with a light-emitting device unit positioned at an arbitrary position as a first light-emitting device unit, a light-emitting device unit adjacent to said first light-emitting device unit in the first direction as a second light-emitting device unit, a light-emitting device unit adjacent to said first light-emitting device unit in the second direction as a fourth light-emitting device unit, and a light-emitting device unit adjacent to said second light-emitting device unit in the second direction as a third light-emitting device unit;

(a) 4i red light-emitting devices making up said four light-emitting device units are classified into 2i red light-emitting devices having a first luminance value and 2i red light-emitting devices having a second luminance value which is lower than the first luminance value, (b) 8i green light-emitting devices making up said four light-emitting device units are classified into 4i green light-emitting devices having a first luminance value and 4i green light-emitting devices having a second luminance value which is lower than the first luminance value, (c) 4i blue light-emitting devices making up said four light-emitting device units are classified into 2i blue light-emitting devices having a first luminance value and 2i blue light-emitting devices having a second luminance value which is lower than the first luminance value, (d) the classification categories of luminance values which the red light-emitting devices making up the first light-emitting device unit and the third light-emitting device unit have belong to the same classification category, and the classification categories of luminance values which the red light-emitting devices making up the second light-emitting device unit and the fourth light-emitting device unit have belong to the same classification category, (e) the classification category of luminance values of the red light-emitting devices making up the first light-emitting device unit and the third light-emitting device unit, and the classification category of luminance values of the red light-emitting devices making up the second light-emitting device unit and the fourth light-emitting device unit, differ, (f) 2i green light-emitting devices making up each of the first, second, third, and fourth light-emitting device units are made up of green light-emitting devices having a first luminance value and green light-emitting devices having a second luminance value that is different from the first luminance value, (g) the classification categories of luminance values which the blue light-emitting devices making up the first light-emitting device unit and the third light-emitting device unit have belong to the same classification category, and the classification categories of luminance values which the blue light-emitting devices making up the second light-emitting device unit and the fourth light-emitting device unit have belong to the same classification category, and (h) the classification category of luminance values of the blue light-emitting devices making up the first light-emitting device unit and the third light-emitting device unit, and the classification category of luminance values of the blue light-emitting devices making up the second light-emitting device unit and the fourth light-emitting device unit, differ.

* * * * *